(12) United States Patent
Omata et al.

(10) Patent No.: US 11,846,874 B2
(45) Date of Patent: Dec. 19, 2023

(54) CAMERA APPARATUS AND METHOD OF ATTACHING CAMERA APPARATUS

(71) Applicant: I-PRO CO., LTD., Fukuoka (JP)

(72) Inventors: Akito Omata, Fukuoka (JP); Hirokazu Tasaka, Fukuoka (JP); Satoshi Kataoka, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 0 days.

(21) Appl. No.: 17/952,543

(22) Filed: Sep. 26, 2022

(65) Prior Publication Data

US 2023/0098781 A1 Mar. 30, 2023

(30) Foreign Application Priority Data

Sep. 27, 2021 (JP) .................................. 2021-156874

(51) Int. Cl.
*G03B 17/08* (2021.01)
*G03B 17/56* (2021.01)

(52) U.S. Cl.
CPC ........... *G03B 17/08* (2013.01); *G03B 17/561* (2013.01)

(58) Field of Classification Search
CPC .............................. G03B 17/08; G03B 17/561
See application file for complete search history.

(56) References Cited

U.S. PATENT DOCUMENTS

| | | | | |
|---|---|---|---|---|
| 10,447,938 | B2 * | 10/2019 | Ekbladh ................. | H04N 23/51 |
| 11,366,372 | B1 * | 6/2022 | Watts ............... | G08B 13/19619 |
| 11,622,166 | B2 * | 4/2023 | Garlock ................. | H04N 23/55 |
| | | | | 348/374 |
| 2010/0272427 | A1 * | 10/2010 | Jung ...................... | H04N 23/51 |
| | | | | 396/427 |
| 2019/0004401 | A1 * | 1/2019 | Wilson ................... | F16M 13/02 |

FOREIGN PATENT DOCUMENTS

JP    2006047868 A   *  2/2006
JP    2020-085922       6/2020

\* cited by examiner

*Primary Examiner* — Clayton E. LaBalle
*Assistant Examiner* — Diana Hancock
(74) *Attorney, Agent, or Firm* — Greenblum & Bernstein, P.L.C.

(57) ABSTRACT

A camera apparatus includes a disk-shaped base portion having a hook portion and fixed to a fixed surface and, an apparatus main body mounting a camera portion and a connector, having a base hinge to be locked to the hook portion, and suspended from the base portion by locking the base hinge to the hook portion, an engagement mechanism engaging the apparatus main body and the base portion such that the apparatus main body and the base portion are not able to be separated from each other in a state that the apparatus main body is rotated in a direction approaching the base portion with the hook portion locking the base hinge as a fulcrum and the apparatus main body is parallel to the base portion, and a dome cover assembly watertightly covering the camera portion and the connector and attached to the apparatus main body.

8 Claims, 18 Drawing Sheets

CAMERA APPARATUS AND METHOD OF ATTACHING CAMERA APPARATUS

CROSS-REFERENCE TO RELATED APPLICATIONS

This application is based on and claims priority under 35 USC 119 from Japanese Patent Application No. 2021-156874 filed on Sep. 27, 2021, the contents of which are incorporated herein by reference.

TECHNICAL FIELD

The present disclosure relates to a camera apparatus and a method of attaching a camera apparatus.

BACKGROUND ART

Patent Literature 1 discloses a monitoring camera that attaches a cover to a main body case by using a slide structure. This monitoring camera includes a main body case that holds a camera unit, and a cover that is attached to the main body case to cover a periphery of the camera unit, and includes a case outer wall that is disposed at a rear-side semicircular portion at a case opening edge portion of the main body case, a case masking rib that is disposed at a front-side semicircular portion at the case opening edge portion and on an inner side of the main body case than the case outer wall, a cover outer wall that is disposed at a front-side semicircular portion at a cover opening edge portion of the cover, and a cover masking rib that is disposed at a rear-side semicircular portion at the cover opening edge portion and on an inner side of the cover than the cover outer wall. The cover outer wall is fitted from a front side with respect to the case masking rib as the cover slides from a front side to a rear side, and the cover masking rib is fitted from the front side with respect to the case outer wall as the cover slides from the front side to the rear side.

CITATION LIST

Patent Literature

Patent Literature 1: JP2020-85922A

SUMMARY OF INVENTION

However, when the monitoring camera is attached to a fixed surface such as a ceiling surface, an operator who attaches the monitoring camera may draw a cable (for example, a local area network (LAN) cable or a power supply cable) drawn out from a hole opened in the ceiling surface into the main body case from a back surface of the main body case and connect the cable to a connector or the like disposed in a main body. That is, when the back surface of the main body cannot be directly attached to the ceiling surface for drawing the cable, the operator needs to hold the main body case with a hand. In a case of such an attachment method, the operator needs to hold the main body case with one hand and pass the cable drawn out by the other hand to the main body case. Therefore, there is a problem that even when the operator works in a high place facing upward, the operator cannot use both hands for cable connection work, or the like, and workability is not improved.

The present disclosure has been made in view of the above-described circumstances in the related art, and an object of the present disclosure is to provide a camera apparatus and a method of attaching a camera apparatus, which enable connection of a cable and the like without supporting an apparatus main body with a hand of an operator during installation, thereby improving workability.

The present disclosure provides a camera apparatus including a substantially disk-shaped base portion that includes a hook portion and that is fixed to a fixed surface; an apparatus main body on which a camera portion and a connector are mounted, the apparatus main body including a base hinge configured to be locked to the hook portion and freely move back and forth, and being configured to be suspended from the base portion by locking the base hinge to the hook portion; an engagement mechanism that is provided over the apparatus main body and the base portion, and that engages the apparatus main body and the base portion such that the apparatus main body and the base portion are not able to be separated from each other in a state in which the apparatus main body is rotated in a direction approaching the base portion with the hook portion that locks the base hinge as a fulcrum and the apparatus main body is substantially parallel to the base portion; and a dome cover assembly that is attached to the apparatus main body to watertightly cover the camera portion and the connector.

Further, the present disclosure provides a method of attaching a camera apparatus including a base portion attachment step of fixing a substantially disk-shaped base portion that includes a hook portion to a fixed surface; a main body suspension step of drawing out a base hinge that is locked to the hook portion from an apparatus main body on which a camera portion and a connector are mounted, locking the base hinge to the hook portion, and suspending the apparatus main body from the base portion; a cable connection step of connecting a cable to the connector; and a main body temporary fixing step of temporarily fixing the apparatus main body and the base portion such that the apparatus main body and the base portion are not able to be separated from each other via an engagement mechanism that is provided over the apparatus main body and the base portion in a state in which the base hinge is retracted to the apparatus main body while the apparatus main body is rotated in a direction approaching the base portion with the hook portion as a fulcrum, and the apparatus main body is substantially parallel to the base portion.

According to the present disclosure, connection of a cable and the like can be performed without supporting an apparatus main body with a hand of an operator during installation and workability can be improved.

DESCRIPTION OF EMBODIMENTS

Hereinafter, embodiments in which a camera apparatus and a method of attaching a camera apparatus according to the present disclosure are specifically disclosed will be described in detail with reference to the drawings as appropriate. However, unnecessarily detailed descriptions may be omitted. For example, a detailed description of a well-known matter or a repeated description of substantially the same configuration may be omitted. This omission is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Figure 1:
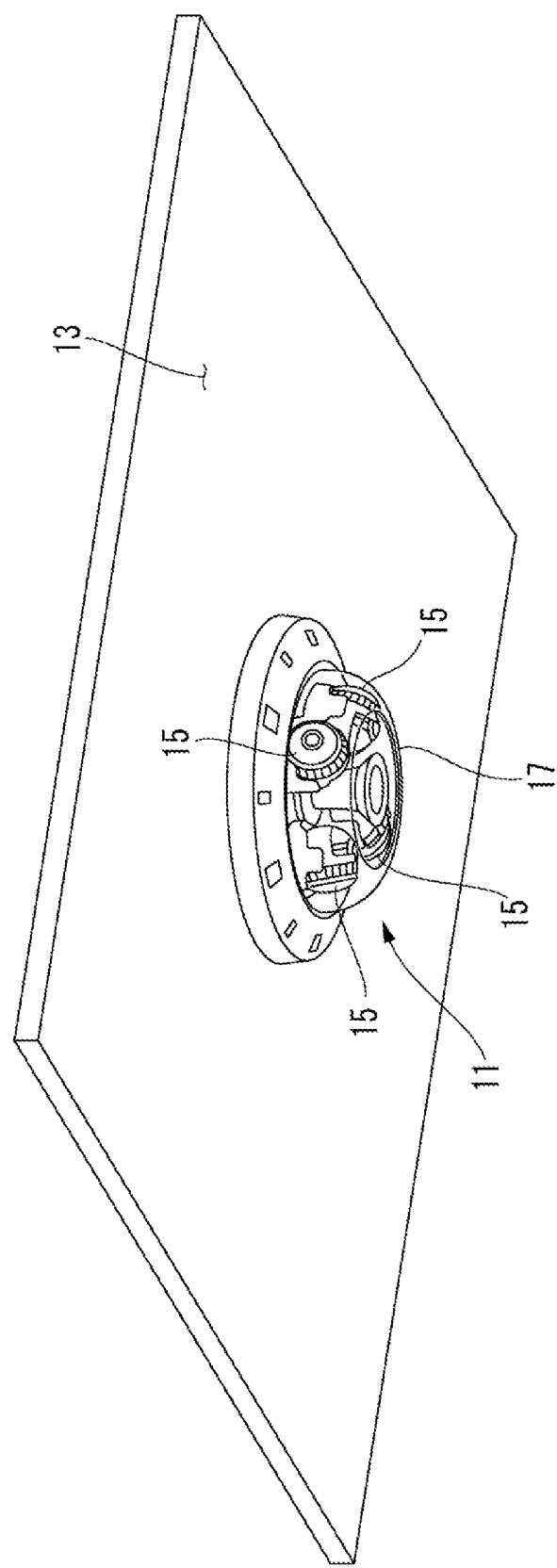
FIG. 1 is a perspective view showing an appearance of a camera apparatus according to a first embodiment in a state of being attached to a ceiling surface.

FIG. 1 is a perspective view showing an appearance of a camera apparatus 11 according to a first embodiment in a state of being attached to a ceiling surface 13. The camera apparatus 11 is a so-called monitoring camera that can be installed either indoors or outdoors. However, the camera apparatus 11 may not be installed for a purpose of monitoring. The camera apparatus 11 can be installed outdoors by ensuring particularly high dustproof and waterproof properties. The camera apparatus 11 is a so-called dome type apparatus in which a protective cover that covers a camera 15 (an example of a camera portion) is a dome cover 17. The dome cover 17 is subjected to hydrophilic coating, and thus has visibility and antifouling properties at a time of rainfall. In the first embodiment, a multi-sensor camera in which a plurality of (for example, four) cameras 15 are covered by the dome cover 17 is illustrated, but the number of cameras 15 may be one.

Figure 2:
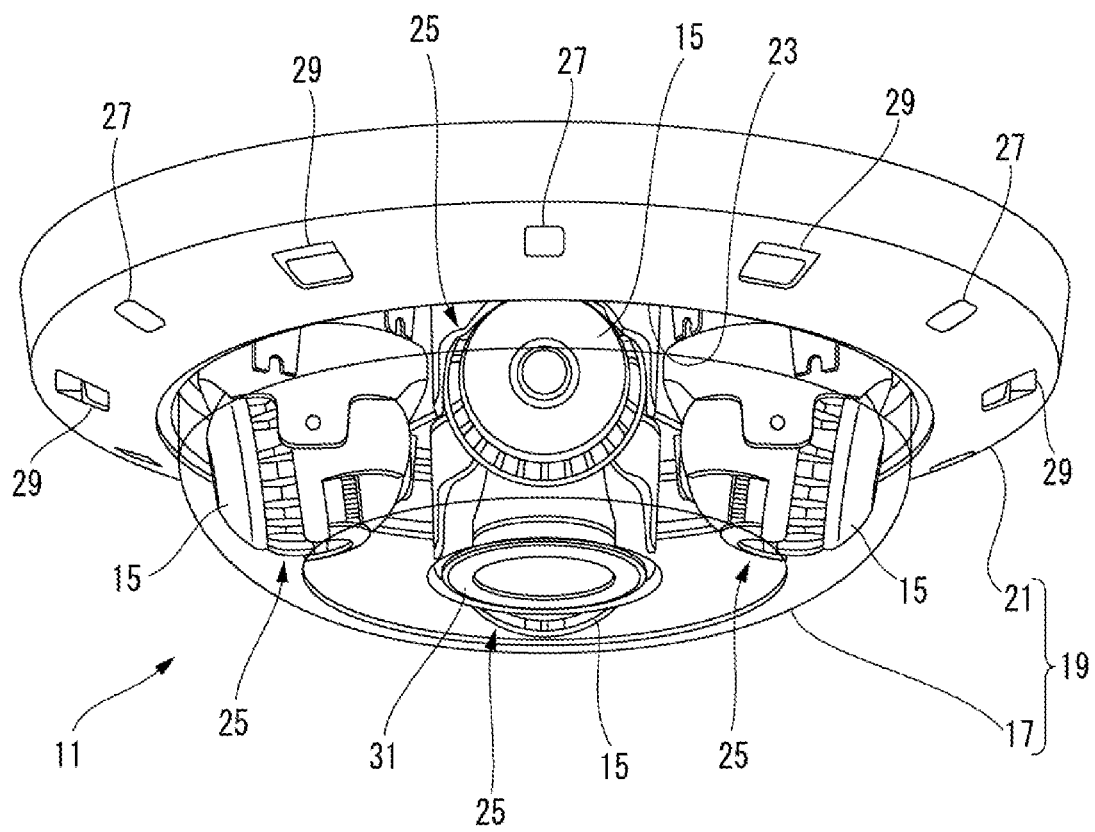
FIG. 2 is a perspective view of the camera apparatus shown in FIG. 1 as viewed obliquely from below.

FIG. 2 is a perspective view of the camera apparatus 11 shown in FIG. 1 as viewed obliquely from below. An apparatus main body of the camera apparatus 11 is covered with a dome cover assembly 19. The dome cover assembly 19 includes a frame housing 21 that is formed in a substantially annular shape and that is attached to the apparatus main body. In the present specification, the substantially annular shape is a concept including an annular shape. The frame housing 21 watertightly fixes an outer periphery of the transparent dome cover 17 to an inner hole 23.

The dome cover 17 covers four camera units 25 mounted on the apparatus main body. Each of the camera units 25 is provided with one camera 15. By rotating the camera 15 held by the camera unit 25 in a predetermined direction, the camera 15 can be directed in a desired imaging direction (in other words, a viewing direction).

A plurality of (for example, six) screw covers 27 are attached to a front surface of the frame housing 21 at equal intervals in a circumferential direction. The screw covers 27 are attached to fixing screw holes. Cover fixing screws for fixing the frame housing 21 to the apparatus main body and the base portion are inserted into the fixing screw holes. Light emission diode (LED) covers 29 that cover LED for infrared ray (IR) light are disposed between adjacent screw covers. A circular center cover 31 made of a non-transparent material is attached to a central portion of the dome cover 17 and is disposed outside a field of view of each camera 15.

Figure 3:
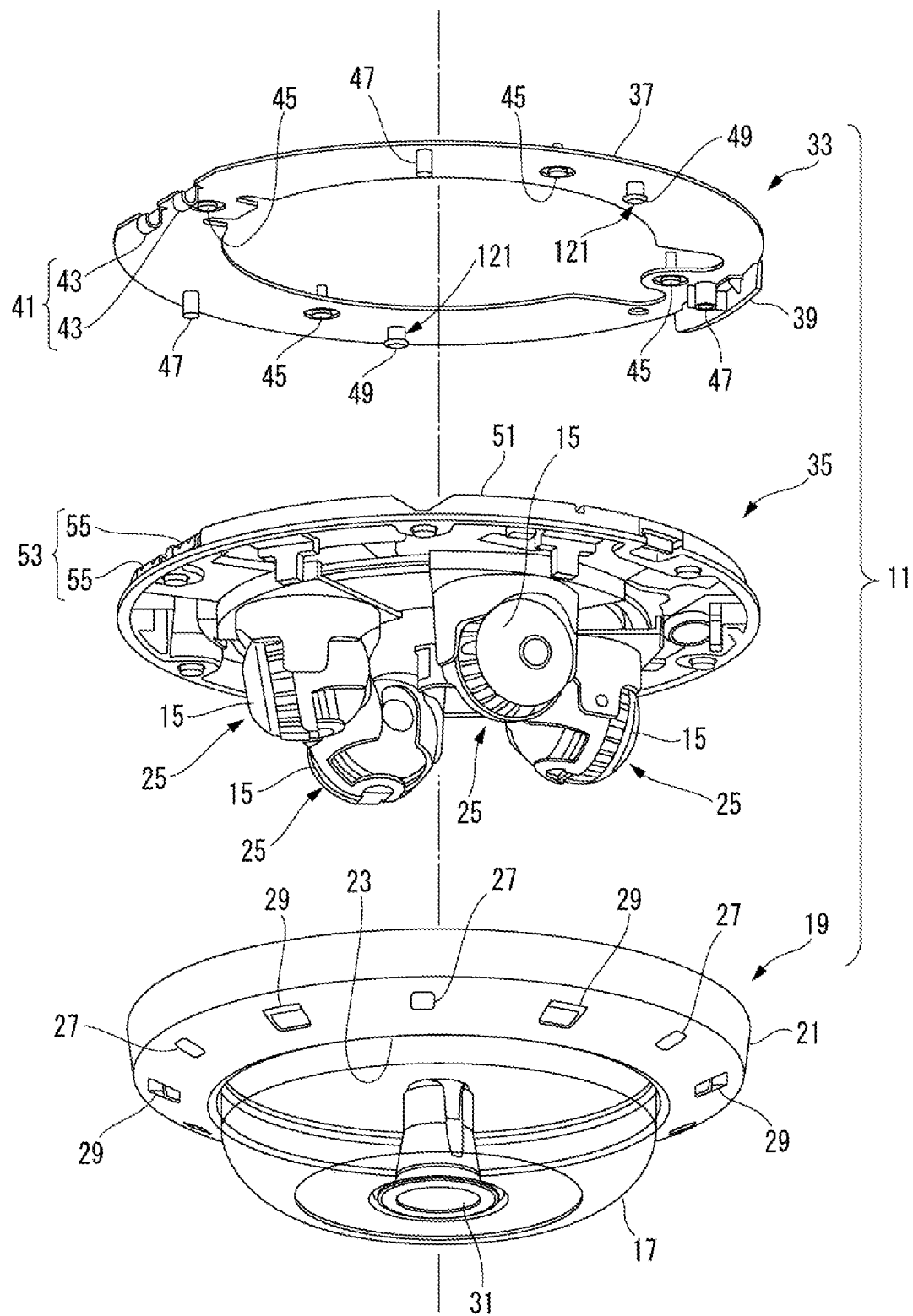
FIG. 3 is an exploded perspective view of the camera apparatus.
Figure 4:
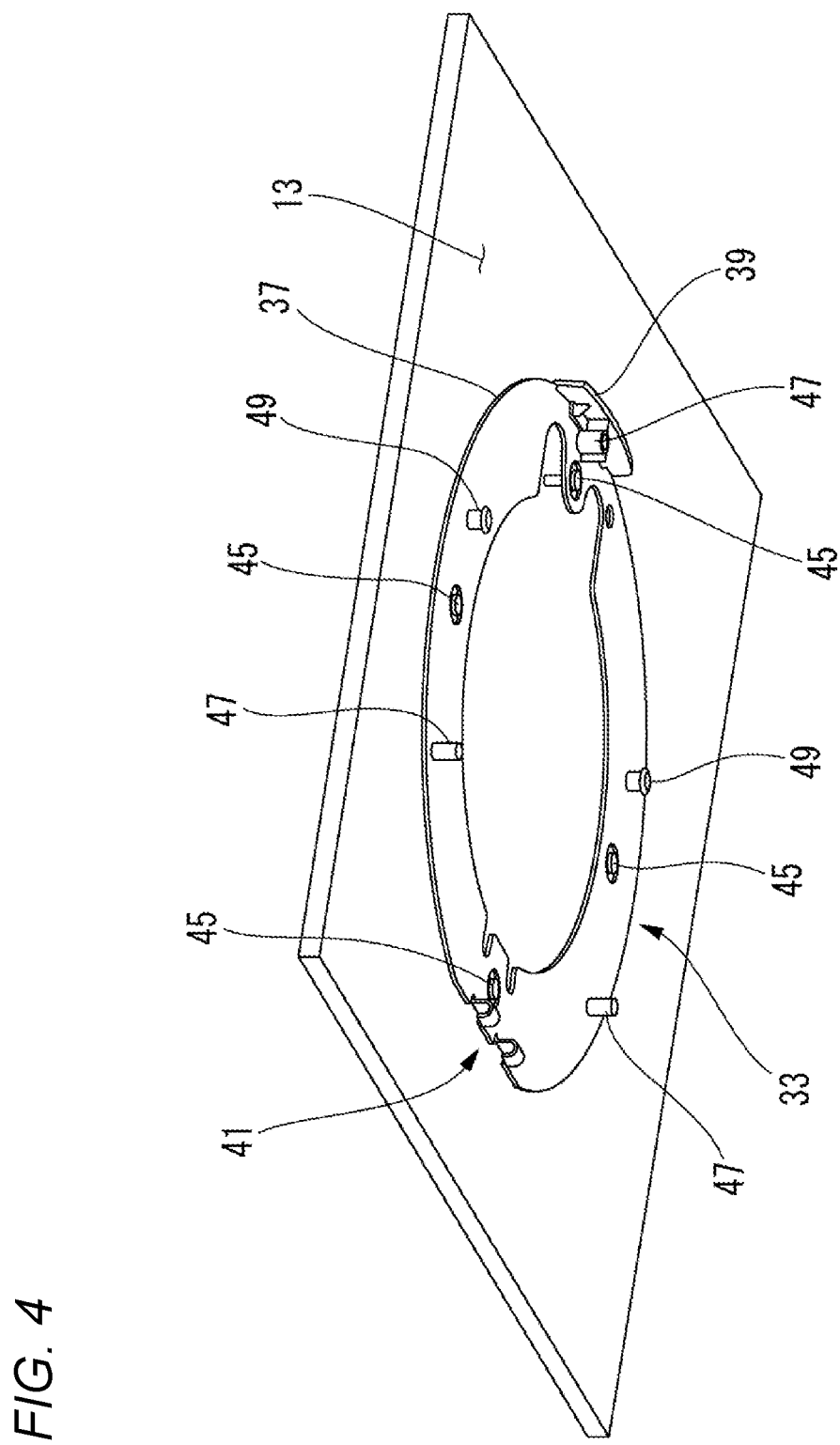
FIG. 4 is a perspective view of a base portion fixed to the ceiling surface.

FIG. 3 is an exploded perspective view of the camera apparatus 11. FIG. 4 is a perspective view of a base portion 33 fixed to the ceiling surface 13. The camera apparatus 11 includes the base portion 33, an apparatus main body 35, and the dome cover assembly 19. The base portion 33 includes an attachment metal fitting 37 and a cable hole cover 39. The attachment metal fitting 37 is formed in a substantially annular plate shape by a sheet metal material. In the present specification, the substantially annular plate shape is a concept including an annular plate shape. A main body locking portion 41 that locks the apparatus main body 35 is provided on an outer periphery of the attachment metal fitting 37. Hook portions 43 are formed in the main body locking portion 41. For example, the pair of hook portions 43 are formed close to each other in parallel with a slight gap in the circumferential direction. The cable hole cover 39 is detachably attached on an opposite side of the main body locking portion 41 in a diametrical direction. The attachment metal fitting 37 is fixed to the ceiling surface 13 by, for example, four attachment fixing screws 45 (see FIG. 4).

A plurality of (for example, three) permanent fixing shafts 47 each including a female screw are fixed to the attachment metal fitting 37 at equal intervals in the circumferential direction, and hang down. The cover fixing screws inserted through the fixing screw holes of the frame housing 21 and penetrating the apparatus main body 35 are screwed and fixed to the permanent fixing shafts 47. That is, the apparatus main body 35 is sandwiched between the dome cover assembly 19 and the base portion 33 and fastened together by the three cover fixing screws.

A pair of male screw members 49 are fixed to the attachment metal fitting 37 between the main body locking portion 41 and the cable hole cover 39 with a center of the attachment metal fitting 37 interposed therebetween, and hang down. The male screw members 49 can temporarily fix the apparatus main body 35 to the base portion 33 as a part of constituent members of an engagement mechanism to be described later.

The apparatus main body 35 includes a main body base 51 made of resin or metal that is formed in a substantially disk shape with a radius substantially the same as that of the base portion 33. In the present specification, the substantially disk shape is a concept including a disk shape. Components such as the camera unit 25, a connector, and a substrate are mounted on the main body base 51.

A rectangular plate-shaped base hinge 53 that is locked to the main body locking portion 41 of the base portion 33 and in which the apparatus main body 35 can be suspended from the base portion 33 is provided on a back surface (in other words, a surface facing the ceiling surface 13) of the main body base 51. The base hinge 53 includes a pair of L-shaped bent portions 55 at a tip end of the base hinge 53 in an advancing direction.

Figure 5:
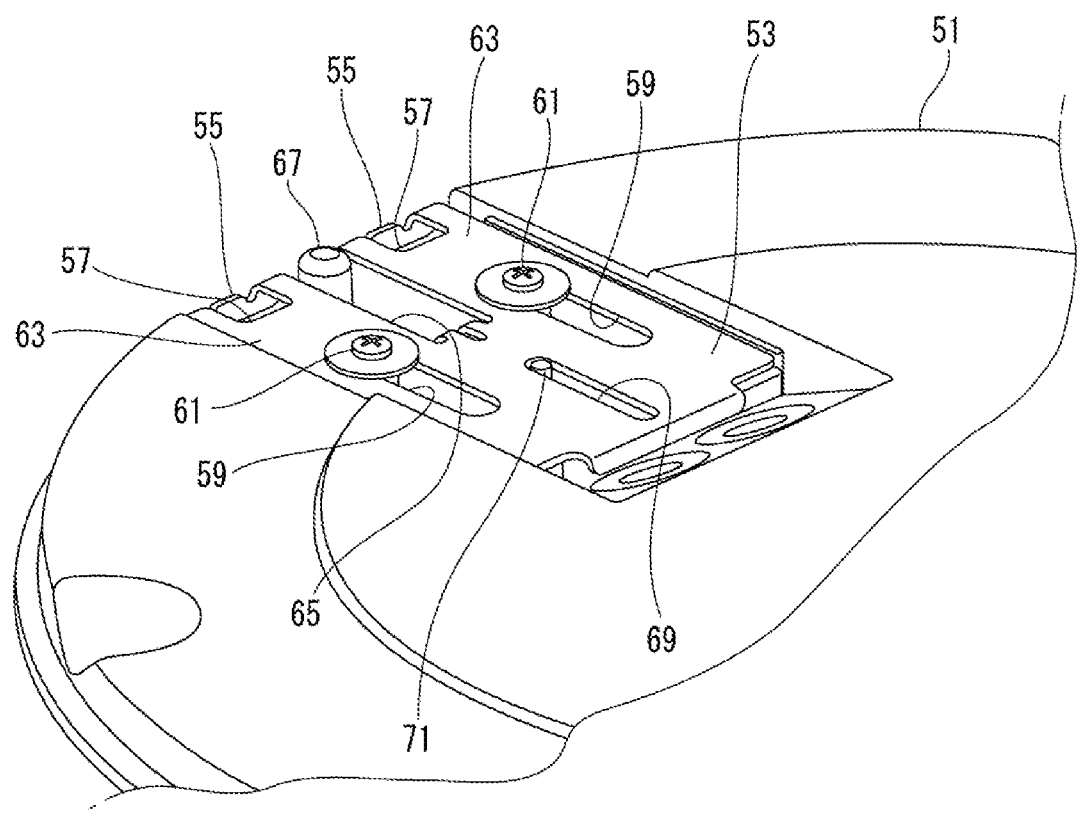
FIG. 5 is an enlarged perspective view of a main part of an apparatus main body in which a base hinge is accumulated on a back surface of a main body base.
Figure 6:
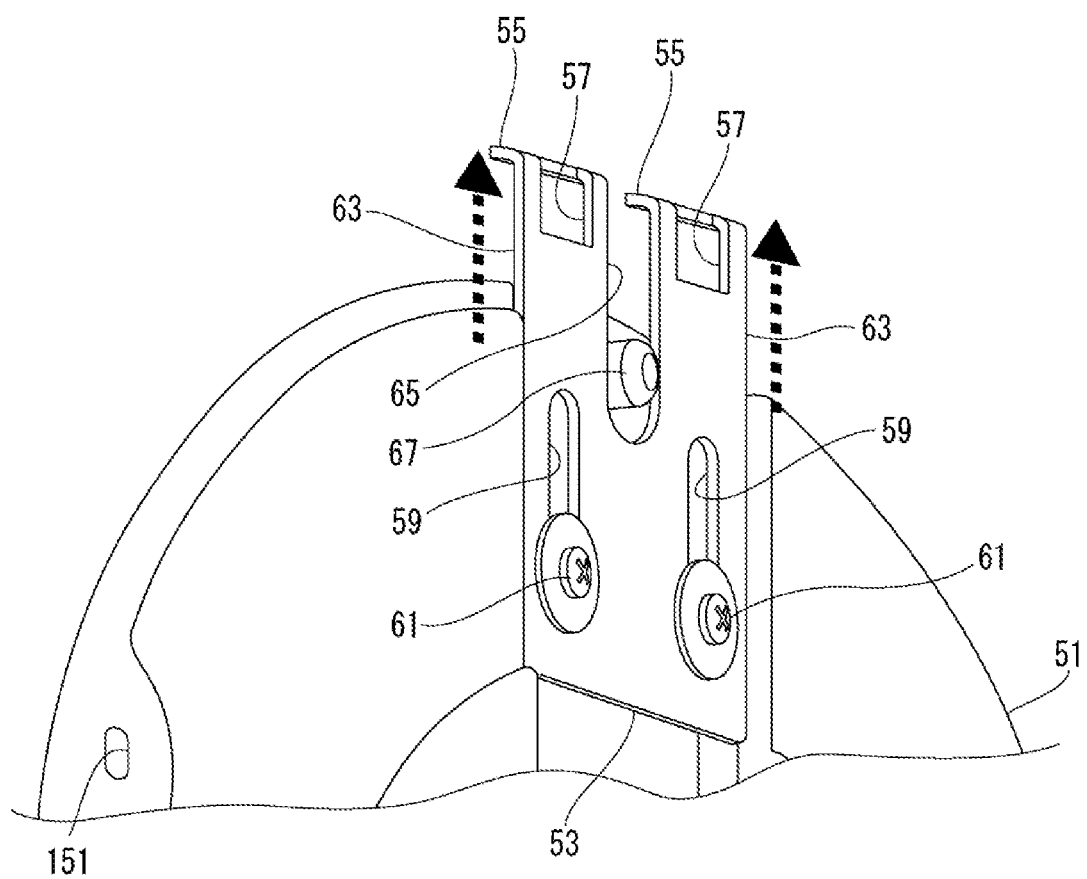
FIG. 6 is an enlarged perspective view of the main part of the apparatus main body showing the back surface of the main body base from which the base hinge is drawn out.

FIG. 5 is an enlarged perspective view of a main part of the apparatus main body 35 in which the base hinge 53 is accumulated on the back surface of the main body base 51. FIG. 6 is an enlarged perspective view of the main part of the apparatus main body 35 showing the back surface of the main body base 51 from which the base hinge 53 is drawn out. The base hinge 53 is formed in a rectangular plate shape by, for example, a sheet metal material. The base hinge 53 is slidably attached to the back surface of the main body base 51, and freely moves back and forth in a radial direction from an outer periphery of the main body base 51 (see FIG. 6). The base hinge 53 is formed by bending in a direction opposite to hooking portions of the hook portions 43 such that the L-shaped bent portions 55 that are locked to the hook portions 43 are opposed to the hook portions 43 on the tip end side in the advancing direction. The base hinge 53 is formed with hook insertion holes 57 through which the hook portions 43 can pass, on base end sides of the L-shaped bent portions 55.

Figure 7:
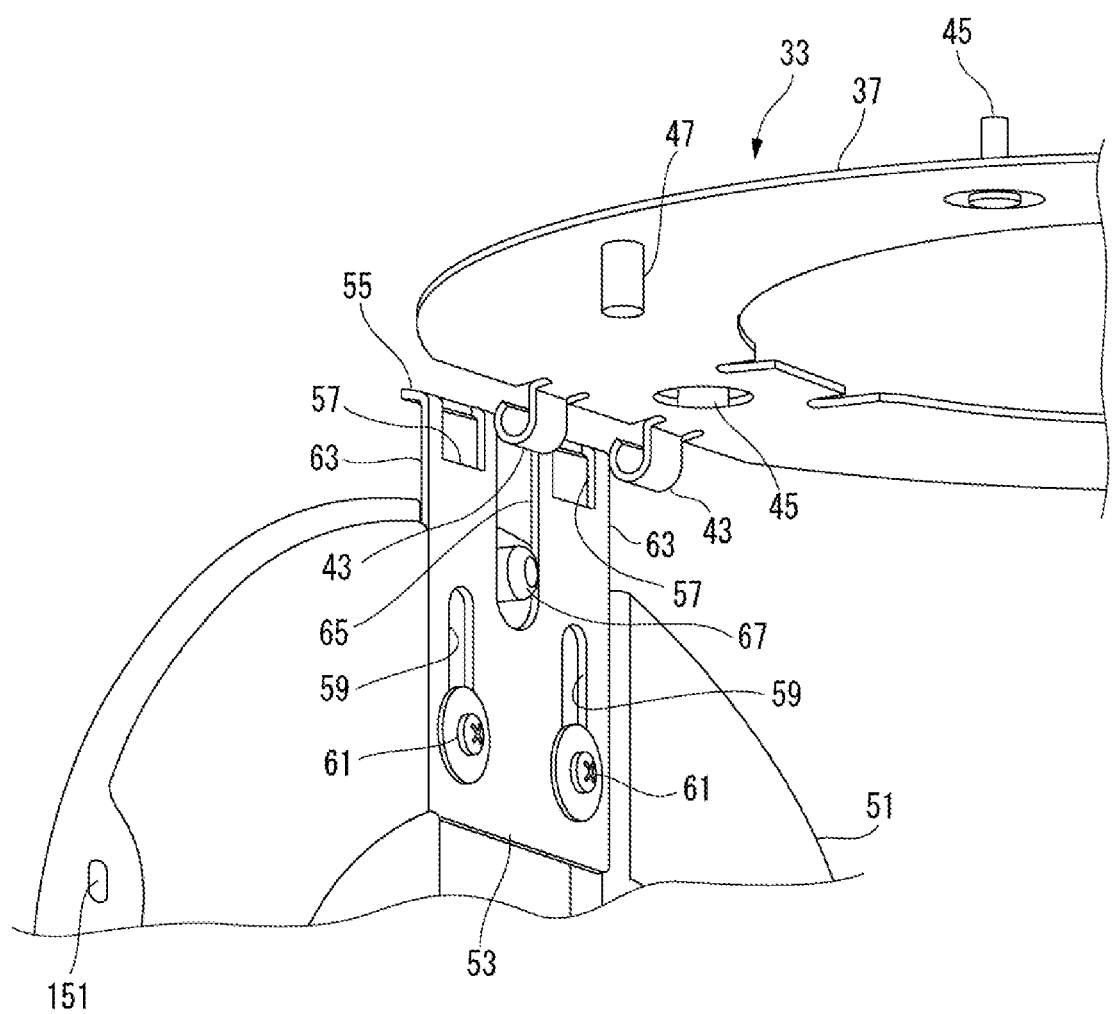
FIG. 7 is an enlarged perspective view of a main part of the apparatus main body immediately before hook portions and L-shaped bent portions are locked or immediately after locking is released.

FIG. 7 is an enlarged perspective view of a main part of the apparatus main body 35 immediately before the hook portions 43 and the L-shaped bent portions 55 are locked or immediately after locking is released. The base portion 33 fixed to the ceiling surface 13 is disposed such that the hook portions 43 hang down in a J-shape from the outer periphery. The hooking portions of J-shaped lower ends of the hook portions 43 are directed radially outward of the base portion 33. In a state in which the base hinge 53 advances from the apparatus main body 35, the hook portions 43 are inserted into the hook insertion holes 57 from a surface on a side opposite to a bending direction of the L-shaped bent portions 55.

Figure 8:
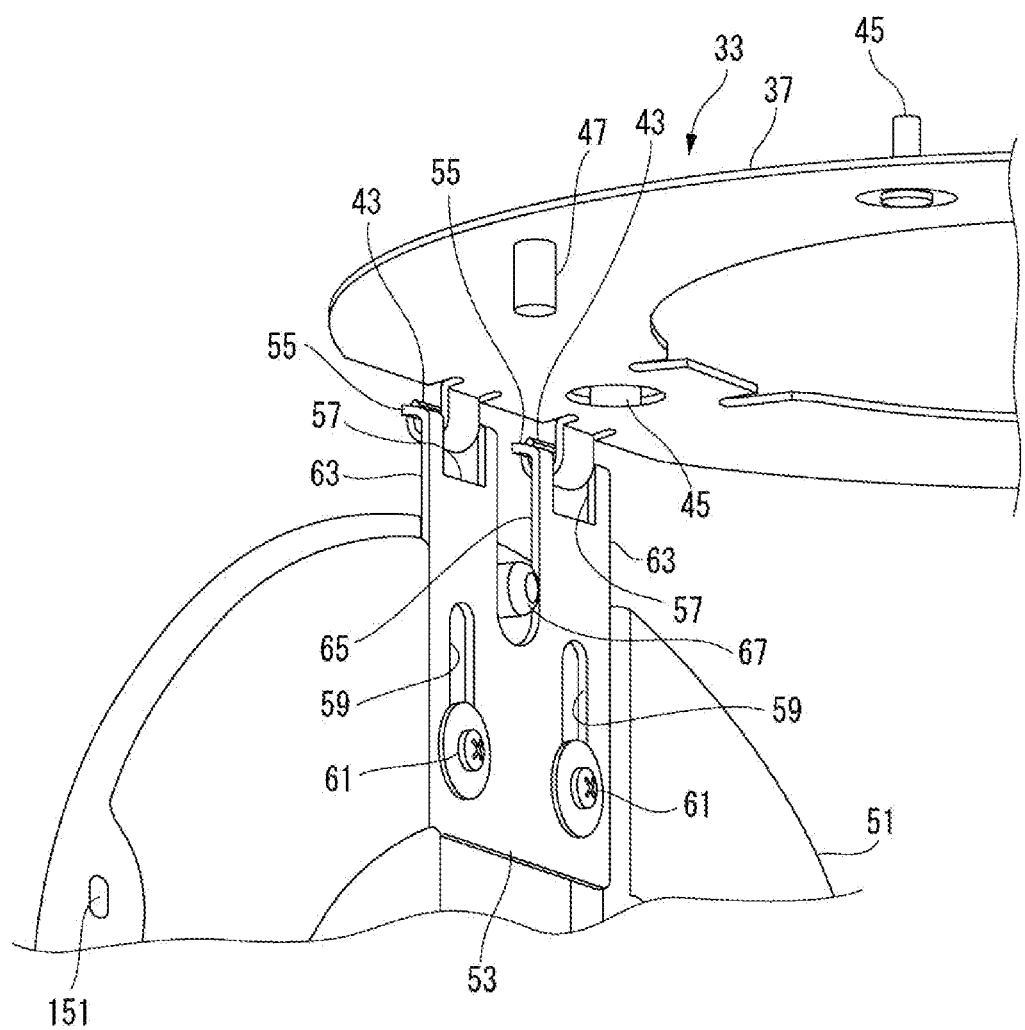
FIG. 8 is an enlarged perspective view of the main part of the apparatus main body in which the L-shaped bent portions are hooked to the hook portions.

FIG. 8 is an enlarged perspective view of the main part of the apparatus main body 35 in which the L-shaped bent portions 55 are hooked to the hook portions 43. In the base hinge 53, by bringing the hook insertion holes 57 close to the hook portions 43 of the base portion 33 and inserting the hook portions 43 into the hook insertion holes 57, the L-shaped bent portions 55 are hooked to the hook portions 43. Accordingly, the apparatus main body 35 can be suspended from the base portion 33 by locking the L-shaped bent portions 55 of the base hinge 53 to the hook portions 43.

Figure 9:
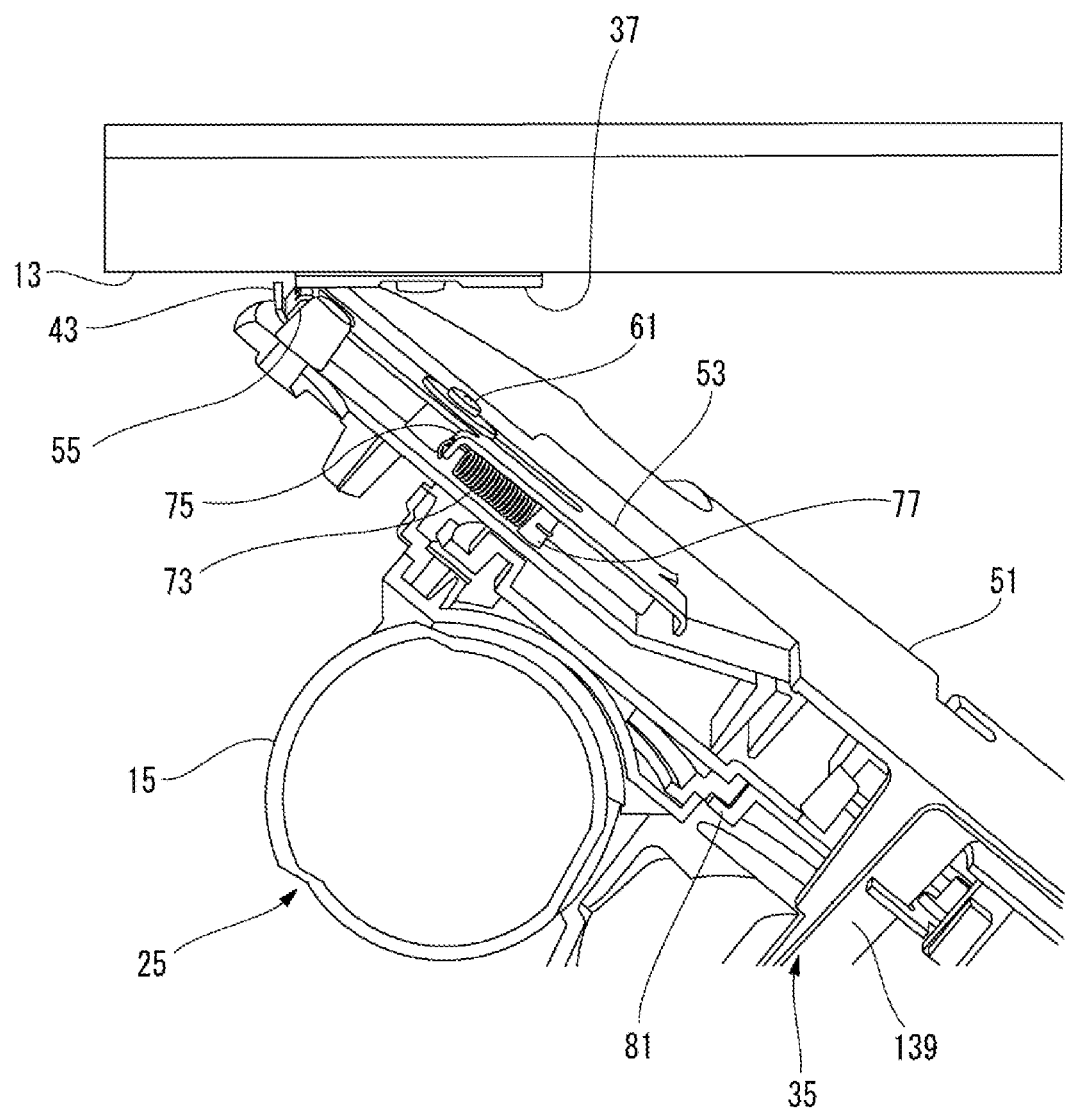
FIG. 9 is an enlarged side sectional view of a main part showing the apparatus main body in the middle of rotation with the hook portion as a fulcrum.

FIG. 9 is an enlarged side sectional view of a main part showing the apparatus main body 35 in the middle of rotation with the hook portions 43 as fulcrums. The base hinge 53 can rotate in a direction approaching the base portion 33 with the hook portions 43 as fulcrums while maintaining a locked state by the L-shaped bent portions 55 sliding along J-shaped inner peripheral surfaces of the hook portions 43. At this time, the base hinge 53 is drawn (in other words, accumulated) into the main body base 51 while gradually retracting to the main body base 51.

FIG. 5 is referred to again. A pair of parallel long holes 59 elongated in an advancing and retracting direction of the base hinge 53 are formed in the base hinge 53. Fixing screws 61 fixed to the apparatus main body 35 are inserted into the respective long holes 59. The fixing screws 61 restrict detachment of the base hinge 53 by mounting a washer having a larger diameter than a short diameter of the long holes 59. Accordingly, the base hinge 53 is slidably supported in a longitudinal direction of the long holes 59.

The pair of L-shaped bent portions 55 are provided at tip ends of a pair of parallel arm portions 63. A portion between the pair of parallel arm portions 63 serves as an advance restriction groove 65. When the base hinge 53 advances by a predetermined length in the advancing and retracting direction, a groove bottom of the advance restriction groove 65 comes into contact with a stopper 67 standing on the main body base 51, and the advance restriction groove 65 restricts further advancement of the base hinge 53 in the advancing and retracting direction. An auxiliary guide groove 69 elongated in the same direction as the long holes 59 may be formed in the base hinge 53. The auxiliary guide groove 69 is engaged with a guide pin 71 standing from the main body base 51, so that the base hinge 53 can be linearly moved with higher accuracy.

As shown in FIG. 9, a tension spring 73 is stretched over the apparatus main body 35 in the base hinge 53. As the tension spring 73, for example, a coil spring is preferably used. One end of the tension spring 73 is supported by a locking piece 75 of the base hinge 53, and the other end of the tension spring 73 is supported by a locking post 77 of the main body base 51. The tension spring 73 biases the base hinge 53 in a direction of retreating inside the main body base 51.

Figure 10:
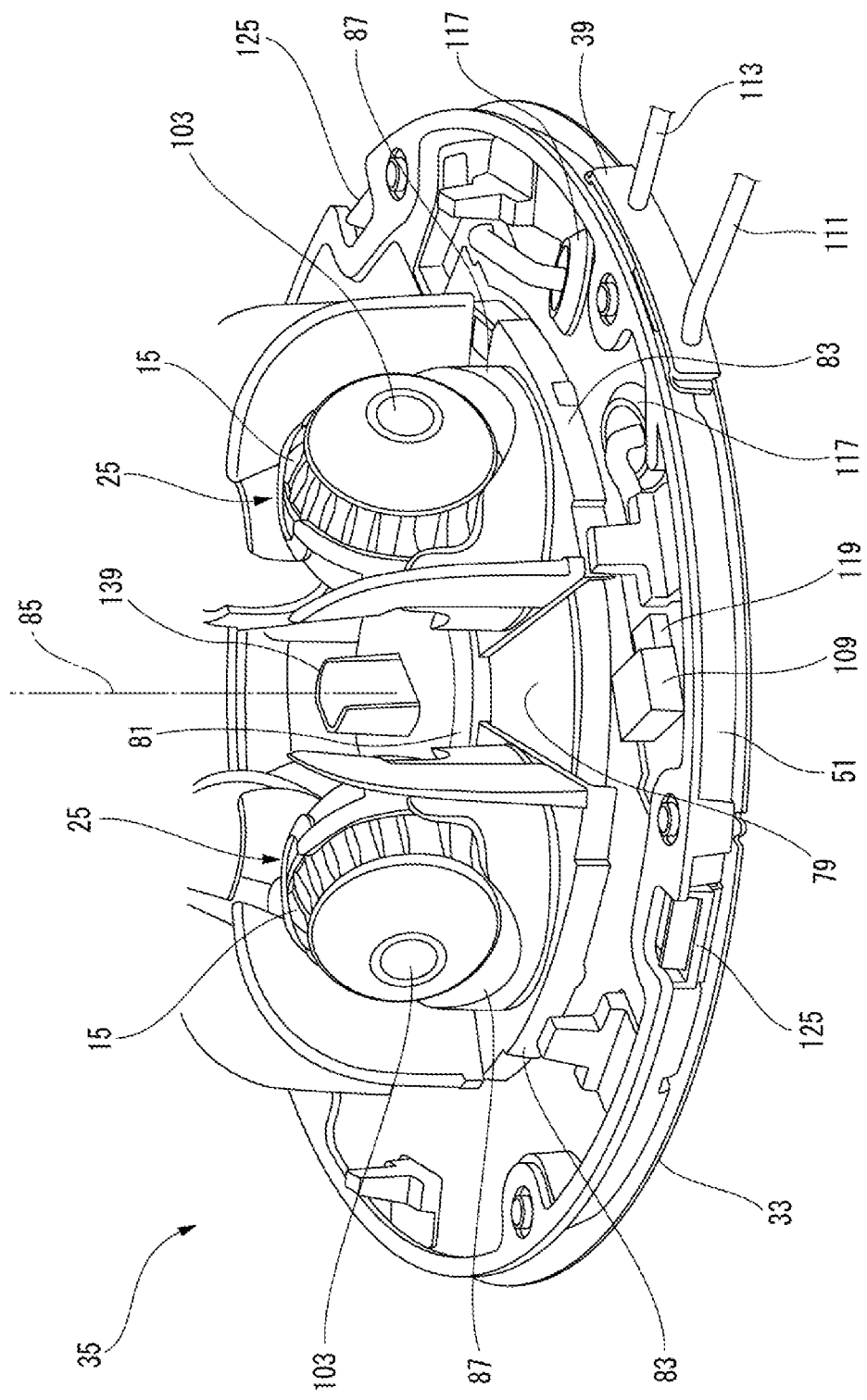
FIG. 10 is a perspective view of the apparatus main body and the base portion that are reversed vertically with respect to a direction of being fixed to the ceiling surface.

FIG. 10 is a perspective view of the apparatus main body 35 and the base portion 33 that are reversed vertically with respect to a direction of being fixed to the ceiling surface 13. In the apparatus main body 35, a pan base 79 formed to have a smaller diameter than the main body base 51 is concentrically attached to the main body base 51. The pan base 79 is attached to the main body base 51 with rotation relative to the main body base 51 restricted. The pan base 79 is fixed to the main body base 51 by a pan base stopper 81 fitted to a central portion.

The four camera units 25 are disposed in the circumferential direction on a front surface of the pan base 79. Each of the camera units 25 is attached via a pan chassis base 83 that is slidable along the circumferential direction of the pan base 79. Accordingly, each of the camera units 25 is pan-rotated around a pan rotation center 85 perpendicular to the central portion of the pan base 79 together with the pan chassis base 83 along the circumferential direction of the pan base 79.

Figure 11:
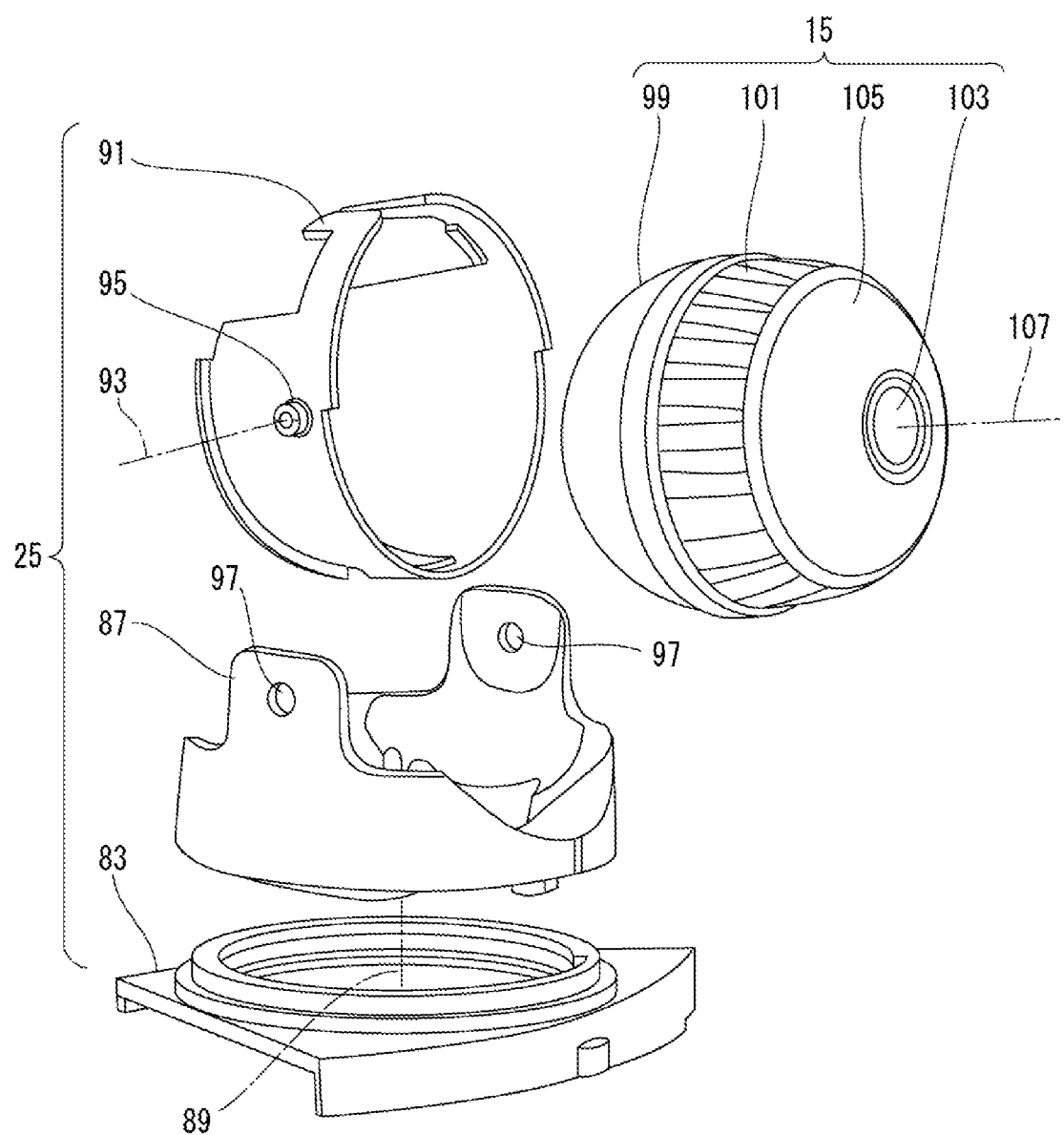
FIG. 11 is an exploded perspective view of a camera unit.

FIG. 11 is an exploded perspective view of the camera unit 25. In the camera unit 25, a pan chassis 87 is attached to the pan chassis base 83. The pan chassis 87 is supported by the pan chassis base 83 to be twist-rotatable around a twist rotation center 89 in the same direction as the pan rotation center 85. A tilt hinge 91 is attached to the pan chassis 87. The tilt hinge 91 is supported by the pan chassis 87 to be tilt-rotatable around a tilt rotation center 93 perpendicular to the twist rotation center 89. The tilt hinge 91 is supported such that a pair of tilt shafts 95 are rotatable in a pair of tilt shaft holes 97 of the pan chassis 87. The camera 15 is attached to the tilt hinge 91. The camera 15 has a substantially spherical shape obtained by a lower cover 99, an upper cover 101, and a substantially hemispherical-shaped light shielding rubber 105 that covers a periphery of a lens 103. The camera 15 is supported by the tilt hinge 91 to be yaw-rotatable around a lens center 107.

FIG. 10 is referred to again. A connector 109 and a power supply unit (not shown) are attached to the apparatus main body 35. The connector 109 is attached to the main body base 51 radially outward of the pan base 79. A cable 111 (for example, a LAN cable) or a power supply line 113 is drawn into the apparatus main body 35. The cable 111 and the power supply line 113 are wired on, for example, a front surface of the ceiling surface 13, penetrate the cable hole cover 39 to enter the back surface of the main body base 51, and penetrate the main body base 51 from the back surface of the main body base 51 to be drawn out to a front surface of the main body base 51. Further, for example, when the cable 111 and the power supply line 113 penetrate the ceiling surface 13 from the inside of a ceiling depth and led out, the cable 111 and the power supply line 113 are directly drawn out to the back surface of the main body base 51, and then penetrate the main body base 51 from the back surface of the main body base 51 to be drawn out to the front surface of the main body base 51.

Figure 12:
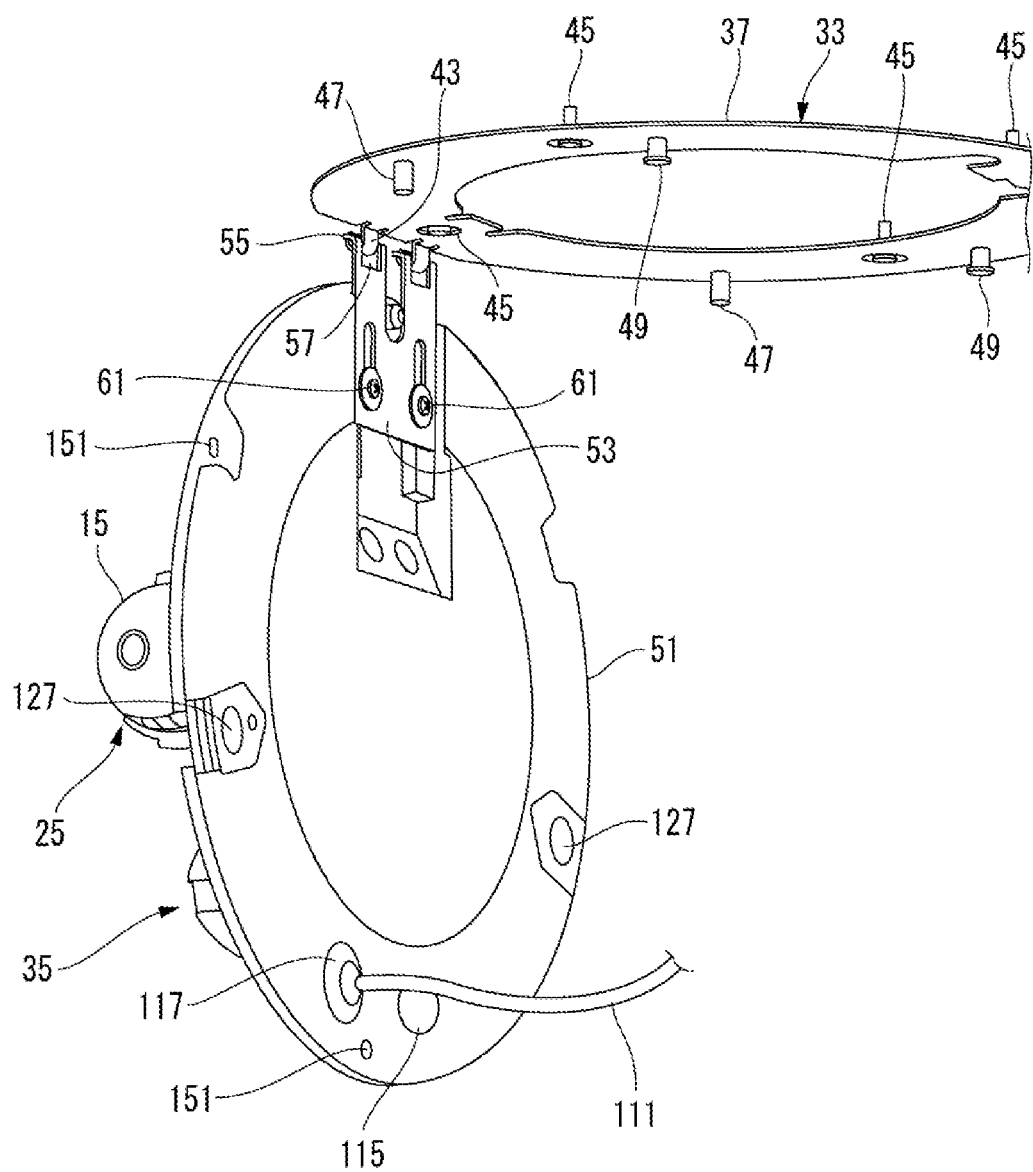
FIG. 12 is a perspective view of the main body base suspended from the base portion via the base hinge in the middle of cable drawing.

FIG. 12 is a perspective view of the main body base 51 suspended from the base portion 33 via the base hinge 53 in the middle of cable drawing. A plurality of (for example, two) drawing-in holes 115 for passing the cable 111 and the power supply line 113 are bored in the back surface of the main body base 51. Grommets 117 are fitted into the drawing-in holes 115. The grommets 117 provide a water-tight seal between the cable 111 and the power supply line 113 and the drawing-in holes 115. A plug 119 (see FIG. 10) of the cable 111 and the power supply line 113 that are drawn out to the front surface of the main body base 51 are connected to the connector 109 and the power supply unit.

Figure 13:
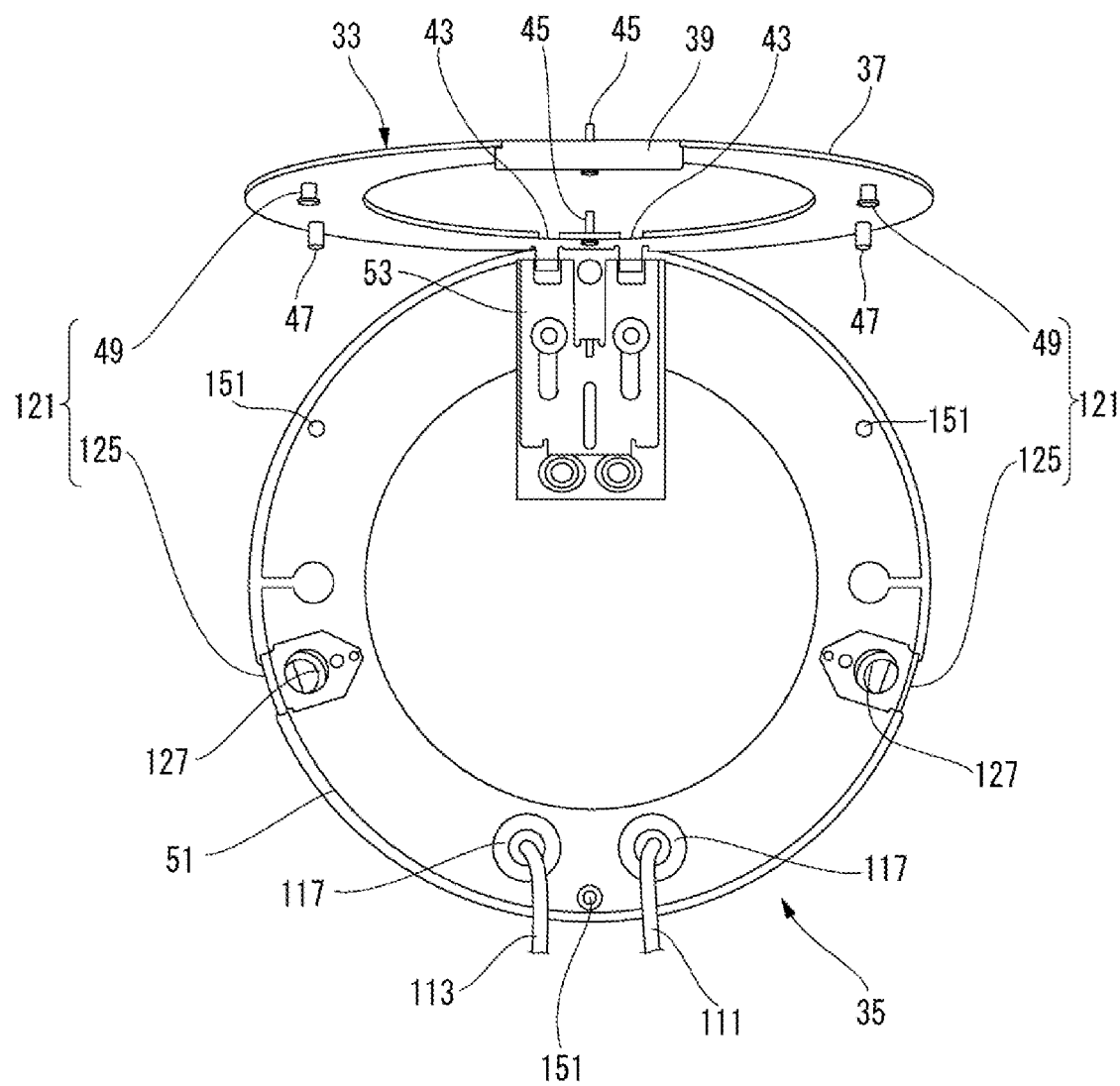
FIG. 13 is a rear view of the main body base suspended from the base portion via the base hinge.

FIG. 13 is a rear view of the main body base 51 suspended from the base portion 33 via the base hinge 53. In the camera apparatus 11, engagement mechanisms 121 are provided over the apparatus main body 35 and the base portion 33. Each of the engagement mechanisms 121 includes the male screw member 49 hanging down from the base portion 33 with a head portion 123 (see FIG. 14) facing downward, and a resin spring member 125. The engagement mechanisms 121 engage the apparatus main body 35 and the base portion 33 such that the apparatus main body 35 and the base portion 33 cannot be separated from each other in a state in which the apparatus main body 35 is rotated in the direction approaching the base portion 33 with the hook portions 43 that lock the base hinge 53 as fulcrums and the apparatus main body 35 is parallel to the base portion 33. Hole portions 127 into which the male screw members 49 enter are formed in the apparatus main body 35 in the state in which the apparatus main body 35 is parallel to the base portion 33.

Figure 14:
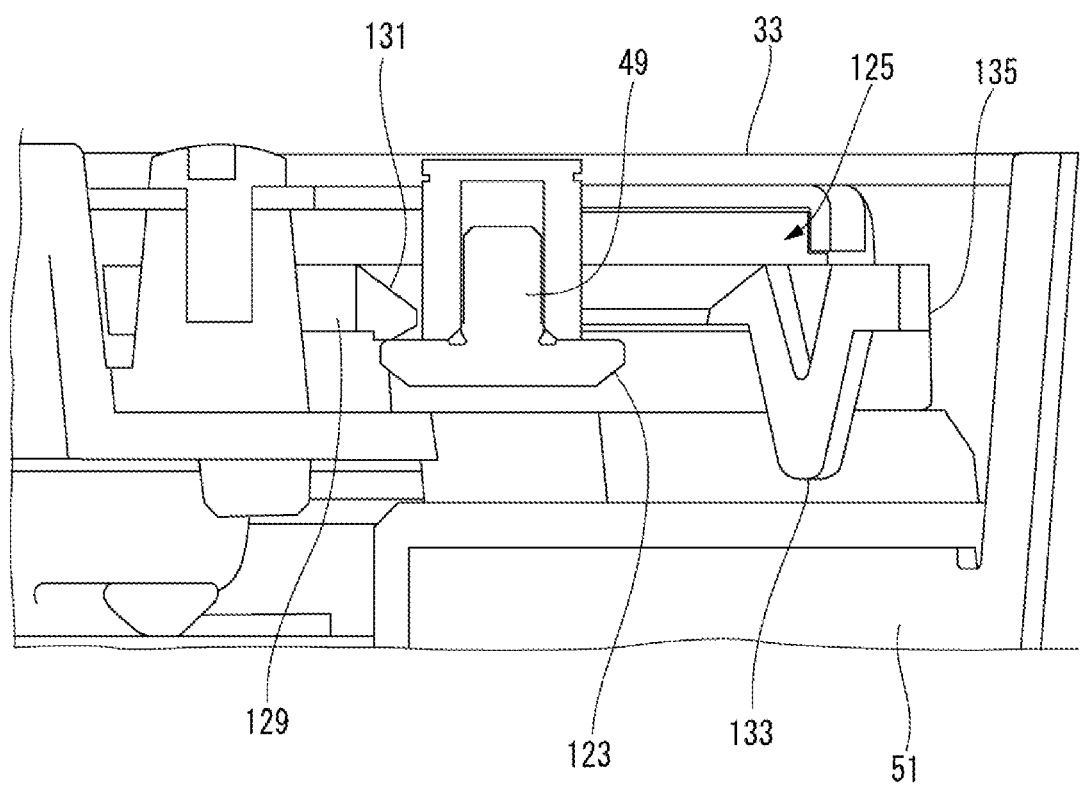
FIG. 14 is an enlarged sectional view of a main part of the apparatus main body in which detachment from the base portion is restricted by a resin spring member engaged with a head portion of a male screw member.

FIG. 14 is an enlarged sectional view of a main part of the apparatus main body 35 in which the detachment from the base portion 33 is restricted by the resin spring member 125 engaged with the head portion 123 of the male screw member 49. The hole portion 127 is provided with the resin spring member 125 that elastically contacts the entered head portion 123 to restrict the detachment of the male screw member 49 from the hole portion 127. In the resin spring member 125, when the head portion 123 enters the hole portion 127, an inclined portion 131 of an engaging claw 129 is pressed by the head portion 123 and is slid leftward in FIG. 14. At this time, an elastic restoring force is accumulated in a spring portion 133. In the resin spring member 125, when the head portion 123 passes through the inclined portion 131, the elastic restoring force of the spring portion 133 causes the engaging claw 129 to slide rightward in FIG. 14 to engage with a neck side of the head portion 123. Accordingly, the engagement mechanism 121 holds (temporarily fixes) the apparatus main body 35 to the base portion 33 in the state in which the apparatus main body 35 is parallel to the base portion 33.

When temporary fixation of the apparatus main body 35 with respect to the base portion 33 is released, in the engagement mechanism 121, a pressing operation portion 135 is pressed leftward in FIG. 14. By this pressing operation, the engagement between the engaging claw 129 and the head portion 123 is released. Accordingly, the apparatus main body 35 is in a suspended state in which the base hinge 53 is hooked to the hook portions 43 again.

Figure 15:
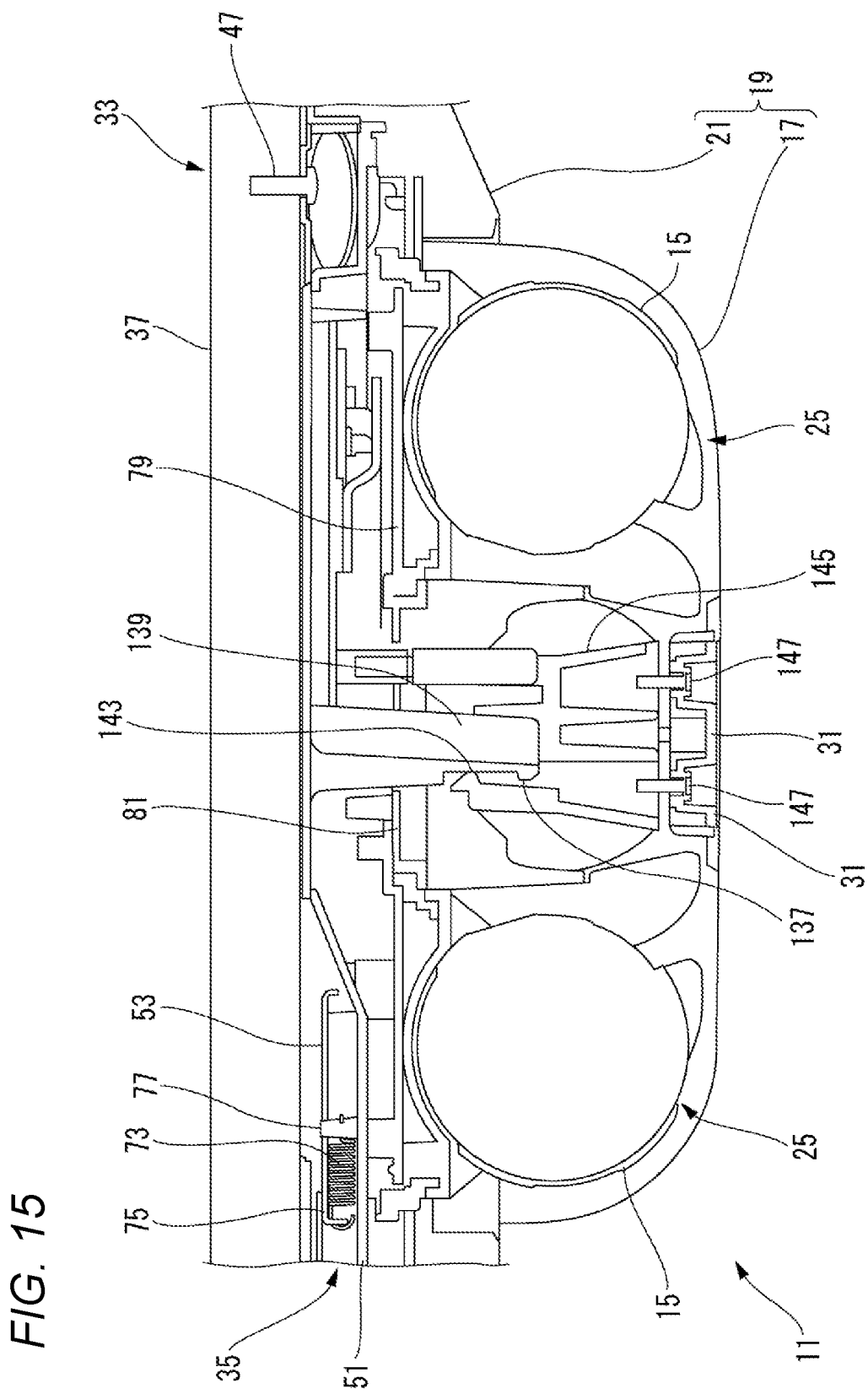
FIG. 15 is a side sectional view of a main part of the camera apparatus in which a dome cover assembly and the apparatus main body are permanently fixed to the base portion.

FIG. 15 is a side sectional view of a main part of the camera apparatus 11 in which the dome cover assembly 19 and the apparatus main body 35 are permanently fixed to the base portion 33. In the camera apparatus 11, the dome cover assembly 19 is attached to the apparatus main body 35 to watertightly cover the camera 15 and the connector 109. The dome cover assembly 19 is finally permanently fixed to the apparatus main body 35 and the base portion 33, but is temporarily fixed to the apparatus main body 35 as a previous stage. That is, a support column 139 that penetrates and protrudes through the pan base 79 and that includes a main body side temporary locking claw 137 at a protruding tip end is provided at a center of the apparatus main body 35.

On the other hand, a dome support 145 that protrudes toward an inner peripheral side and that includes a cover side temporary locking claw 143 that can be temporarily locked to the main body side temporary locking claw 137 of the support column 139 is provided at a center of the dome cover 17. The dome support 145 is fixed to the circular center cover 31 provided at the center of the dome cover 17 by support fixing screws 147.

Figure 16:
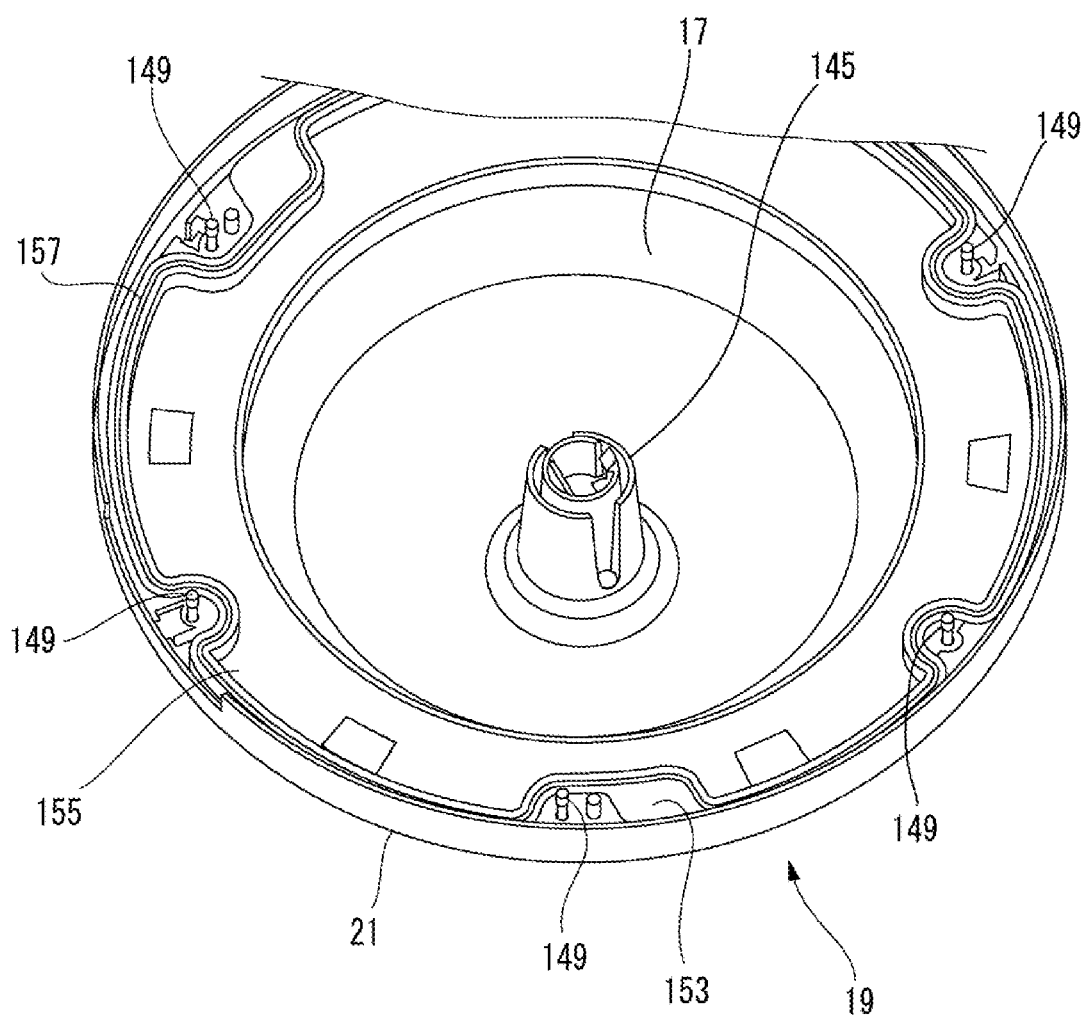
FIG. 16 is a perspective view of the dome cover assembly as viewed from inside.

FIG. 16 is a perspective view of the dome cover assembly 19 as viewed from the inside. The dome cover assembly 19 is combined (in other words, covered) with the apparatus main body 35 from below with a bowl-shaped inner peripheral side facing upward. At this time, the dome support 145 standing from the dome cover assembly 19 and the support column 139 hanging down from the apparatus main body 35 are coaxially inserted. The dome cover assembly 19 in which the dome support 145 is inserted into the support column 139 cannot be detached (in other words, does not fall) downward by the cover side temporary locking claw 143 being temporarily locked to the main body side temporary locking claw 137.

The dome cover assembly 19 is brought into contact with the apparatus main body 35 by being slightly lifted upward at the time of permanent fixation. In this state, the dome cover assembly 19 can be permanently fixed by screwing the annular frame housing 21 to the apparatus main body 35 and the base portion 33. In the dome cover assembly 19, three of six cover fixing screws 149 inserted into the fixing screw holes of the frame housing 21 are screwed into the apparatus main body 35, and the other three of the cover fixing screws 149 penetrate through through holes 151 (see FIG. 13) bored in the main body base 51 of the apparatus main body 35 and are screwed to the permanent fixing shafts 47 of the base portion 33. An annular plate-shaped dome packing 153 is fixed to an annular inner surface of the frame housing 21 by a dome holder plate 155. The dome packing 153 is formed with an annular lip portion 157 that watertightly seals a gap between the dome packing 153 and the main body base 51.

Accordingly, the dome cover assembly 19, the apparatus main body 35, and the base portion 33 are watertightly assembled, and are integrally fixed to the ceiling surface 13.

Next, a procedure of the method of attaching a camera apparatus will be described.

The method of attaching a camera apparatus according to the first embodiment includes a base portion attachment step, a main body suspension step, a cable connection step, a main body temporary fixing step, a dome cover assembly temporary fixing step, and a dome cover assembly permanent fixing step.

In the base portion attachment step, the disk-shaped base portion 33 that includes the hook portions 43 is fixed to the ceiling surface 13 by the attachment fixing screws 45 (see FIG. 4).

Figure 17:
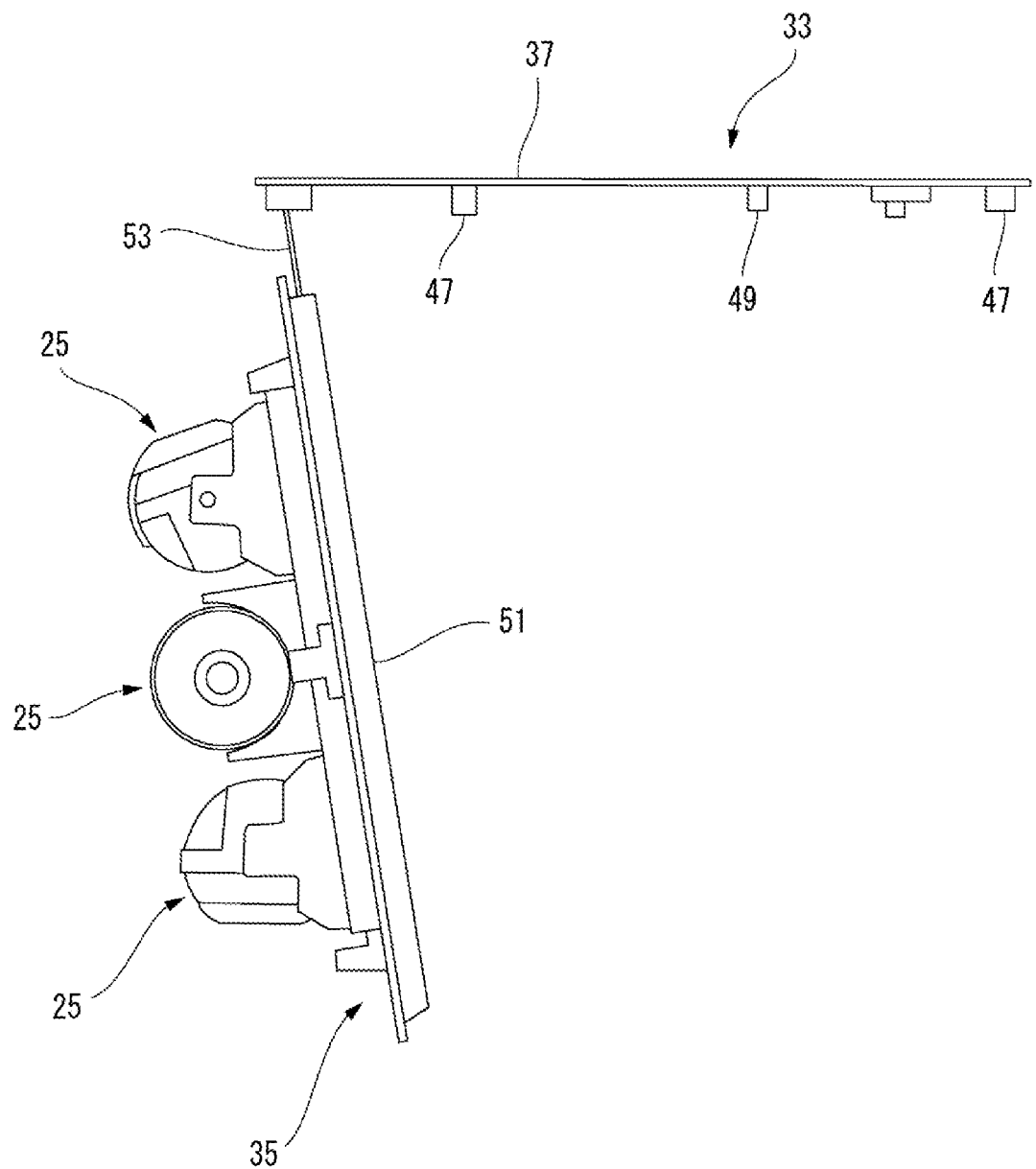
FIG. 17 is a side view of the apparatus main body suspended from the base portion.

FIG. 17 is a side view of the apparatus main body 35 suspended from the base portion 33. In the main body suspension step, the base hinge 53 locked to the hook portions 43 is drawn out from the apparatus main body 35 on which the camera 15 and the connector 109 are mounted (see FIG. 6). By passing the hook portions 43 through the hook insertion holes 57 of the drawn-out base hinge 53, the base hinge 53 is locked to the hook portions 43, and the apparatus main body 35 is suspended from the base portion 33 (see FIGS. 8 and 17).

In the cable connection step, the cable 111 and the like are drawn from the back surface of the main body base 51 in the suspended apparatus main body 35 through the drawing-in holes 115 to a front surface side (see FIG. 12). The cable 111 drawn out to the front surface of the apparatus main body 35 is electrically connected to the apparatus main body 35 by the plug 119 being coupled to the connector 109 (see FIG. 10).

Figure 18:
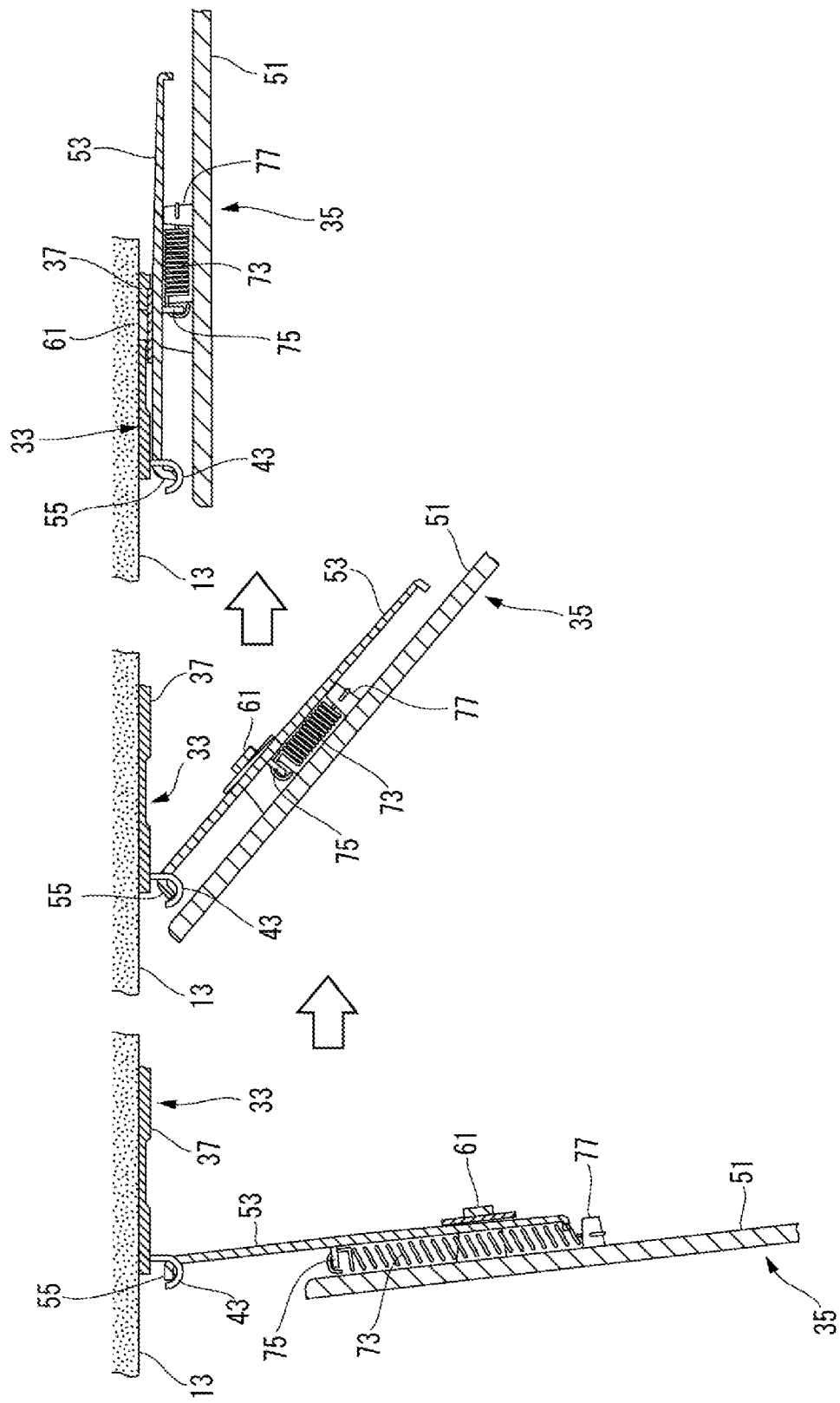
FIG. 18 is a state transition diagram until the suspended apparatus main body is temporarily fixed.

FIG. 18 is a state transition diagram until the suspended apparatus main body 35 is temporarily fixed. In the main body temporary fixing step, the apparatus main body 35 is rotated in the direction approaching the base portion 33 with the hook portions 43 as fulcrums. At this time, the base hinge 53 gradually retracts to the apparatus main body 35 together with the rotation. That is, the base hinge 53 is drawn in by a biasing force of the tension spring 73 (see a center diagram of FIG. 18). In the state in which the apparatus main body 35 is parallel to the base portion 33 (a state in a right diagram of FIG. 18), the apparatus main body 35 and the base portion 33 are temporarily fixed so as not to be separated from each other by the head portion 123 and the resin spring member 125 of the engagement mechanism 121 provided over the apparatus main body 35 and the base portion 33 (see FIG. 14).

In the dome cover assembly temporary fixing step, the dome support 145 of the dome cover assembly 19 is inserted into the support column 139 of the apparatus main body 35. The dome cover assembly 19 is in a hanging state by temporarily locking the cover side temporary locking claw 143 to the main body side temporary locking claw 137, and cannot be detached. That is, the main body side temporary locking claw 137 and the cover side temporary locking claw 143 shown in FIG. 15 are locked, and the dome cover assembly 19 is supported at a position slightly lowered (separated) from the apparatus main body 35.

In the dome cover assembly permanent fixing step, the dome cover assembly 19 hanging in a temporarily fixed state is slightly lifted upward, and is brought into contact with the apparatus main body 35. In this state, in the dome cover assembly 19, the cover fixing screws 149 inserted through the fixing screw holes of the frame housing 21 are screwed into the apparatus main body 35 and the base portion 33.

Accordingly, in the camera apparatus 11, the dome cover assembly 19, the apparatus main body 35, and the base portion 33 are integrated with the ceiling surface 13 to complete fixing.

Next, an action of the camera apparatus 11 according to the first embodiment will be described.

The camera apparatus 11 includes the substantially disk-shaped base portion 33 that includes the hook portions 43 and that is fixed to a fixed surface (for example, the ceiling surface 13), and the apparatus main body 35 on which the camera portion (for example, the camera 15) and the connector 109 are mounted, the apparatus main body 35 including the base hinge 53 configured to be locked to the hook portions 43 and freely move back and forth, and being configured to be suspended from the base portion 33 by locking the base hinge 53 to the hook portions 43. The camera apparatus 11 includes the engagement mechanism 121 that is provided over the apparatus main body 35 and the base portion 33, and that engages the apparatus main body 35 and the base portion 33 such that the apparatus main body 35 and the base portion 33 are not able to be separated from each other in the state in which the apparatus main body 35 is rotated in the direction approaching the base portion 33 with the hook portions 43 that lock the base hinge 53 as fulcrums and the apparatus main body 35 is substantially parallel to the base portion 33, and the dome cover assembly 19 that is attached to the apparatus main body 35 to watertightly cover the camera portion 15 and the connector 109.

The camera apparatus 11 is provided with the disk-shaped base portion 33 that is fixed to the ceiling surface 13 alone during installation. The hook portions 43 are formed on the base portion 33, and the hook portions 43 can be hooked in the state in which the base portion 33 is fixed parallel to the ceiling surface 13.

The apparatus main body 35 on which the camera 15 and the connector 109 are mounted includes the plate-shaped base hinge 53 to freely move back and forth. The apparatus main body 35 has a circular shape having a radius substantially the same as that of the base portion 33 in a plan view. The base hinge 53 slides in the radial direction of the apparatus main body 35 and advances and retracts inside and outside the apparatus main body 35.

The base hinge 53 can be hooked (locked) to the hook portions 43 of the base portion 33. The apparatus main body 35 in which the base hinge 53 is locked to the hook portions 43 can be supported in the state of being suspended from the base portion 33. In the suspended apparatus main body 35, the front surface on which the camera 15, the connector 109, and the like are mounted, and the back surface including the drawing-in holes 115 of the cable 111 and the like are exposed at the same time.

Accordingly, the operator can easily pass the cable 111 from the back surface to the front surface of the apparatus main body 35 using both hands without holding the apparatus main body 35 by a hand, and can easily and safely perform connection work of the cable 111.

More specifically, drawing-in work of the cable 111 is performed to have a watertight structure. That is, the cable 111 watertightly penetrates through the grommet 117 made of rubber. An outer periphery of the grommet 117 through which the cable 111 penetrates is watertightly fitted in the drawing-in hole 115 provided in the apparatus main body 35. Accordingly, the apparatus main body 35 is watertightly sealed by the grommet 117 between the cable 111 and the drawing-in holes 115. Even when the camera apparatus 11 has such a watertight structure of the cable 111, the apparatus main body 35 is supported in the hanging state, so that the grommets 117 can be attached from the front and back of the apparatus main body 35 using both hands, and compared with a case in which the apparatus main body 35 is not supported and is held by a hand, installation work can be safely performed with better workability.

The apparatus main body 35 into which the cable 111 is drawn is rotated in the direction approaching the base portion 33 with the hook portions 43 that lock the base hinge 53 as fulcrums. When the apparatus main body 35 is rotated and is parallel to the base portion 33, the apparatus main body 35 cannot be separated from the base portion 33 and is engaged with the base portion 33 by the engagement mechanisms 121 provided over the apparatus main body 35 and the base portion 33. Accordingly, the apparatus main body 35 is temporarily fixed to the base portion 33.

With the temporarily fixed apparatus main body 35, connection between the cable 111 and the connector 109 and adjustment of an angle of view of the camera 15 can be easily performed using both hands.

The dome cover assembly 19 is mounted on the apparatus main body 35 in which the connection of the cable 111, the adjustment of the angle of view, and the like are completed. The dome cover assembly 19 is fixed to the apparatus main body 35 by a plurality of screws. Of the plurality of screws, some of the screws are directly screwed to the base portion 33. Accordingly, the dome cover assembly 19 and the apparatus main body 35 are permanently fixed to base portion 33.

In the camera apparatus 11, the apparatus main body 35 includes the substantially disk-shaped main body base 51, the substantially disk-shaped pan base 79 that is formed to have a smaller diameter than the main body base 51 and on which the camera portion (for example, the camera 15) is mounted is concentrically attached to the main body base 51, and the connector 109 is disposed on the main body base 51 radially outward of the pan base 79.

In the camera apparatus 11, the apparatus main body 35 includes the disk-shaped main body base 51. In the apparatus main body 35, components such as the camera 15, the connector 109, or the substrate are mounted on the main body base 51. At least the camera 15 is installed on the pan base 79 that is formed to have a smaller diameter than the main body base 51, and that is concentrically attached to the main body base 51.

The camera 15 is installed on the pan base 79, and pan, twist, tilt and yaw rotations are allowed.

On the other hand, the connector 109 is attached to the main body base 51 outward of the pan base 79. That is, the connector 109 is attached to the main body base 51 to be lower than when the connector 109 is attached to the pan base 79 by a thickness of the pan base 79.

Accordingly, in the camera apparatus 11, by disposing the connector 109 that is to be assembled with a particularly large height dimension at a low position, a height of the apparatus main body 35 is reduced and a low profile is implemented.

In the camera apparatus 11, the support column 139 that penetrates and protrudes through the pan base 79 and that includes the main body side temporary locking claw 137 at the protruding tip end is provided at the center of the apparatus main body 35, the dome cover assembly 19 includes the frame housing 21 that is formed in a substantially annular shape, that is attached to the apparatus main body 35, and that watertightly fixes the outer periphery of the transparent dome cover 17 to the inner hole 23, and the dome support 145 that protrudes toward the inner peripheral side and that includes the cover side temporary locking claw 143 that is able to be temporarily locked to the main body side temporary locking claw 137 of the support column 139 is provided at the center of the dome cover 17.

In the camera apparatus 11, the support column 139 is provided at the center of the apparatus main body 35. The support column 139 penetrates and protrudes through the center of the pan base 79 concentrically attached to the main body base 51. The support column 139 includes the main body side temporary locking claw 137 at the protruding tip end.

On the other hand, the dome cover assembly 19 attached to the apparatus main body 35 includes the frame housing 21 that is formed in an annular shape and that is attached to the apparatus main body 35. The annular frame housing 21 watertightly fixes the outer periphery of the transparent dome cover 17 to the inner hole 23. That is, the dome cover assembly 19 is integrated with the dome cover 17 and the frame housing 21 and is watertightly permanently fixed to the apparatus main body 35 via the frame housing 21 with screws or the like.

Here, the dome cover assembly 19 is supported by being temporarily fixed to the apparatus main body 35 before the dome cover assembly 19 is permanently fixed to the apparatus main body 35. That is, in the dome cover assembly 19, the dome support 145 protrudes to the inner periphery side and is provided at the center of the dome cover 17. Since the dome cover 17 is formed in a bowl shape, the dome support 145 extends axially from the center of the inner periphery side thereof. Since the dome support 145 is out of a range of the angle of view of the camera 15, the dome support 145 does not need to be made of a transparent material. The dome support 145 includes the cover side temporary locking claw 143 that can be temporarily locked to the main body side temporary locking claw 137 of the support column 139.

The dome cover assembly 19 is combined with the apparatus main body 35 that is temporarily fixed to the ceiling surface 13 via the base portion 33 from below with the bowl-shaped inner peripheral side facing upward. At this time, the dome support 145 standing from the dome cover assembly 19 and the support column 139 hanging down from the apparatus main body 35 are coaxially inserted. In the dome cover assembly 19 in which the dome support 145 is inserted into the support column 139, when the hand is released, the dome cover assembly 19 is slightly lowered in an axial direction by its own weight, and then the cover side temporary locking claw 143 is temporarily locked to the main body side temporary locking claw 137, so that the dome cover assembly 19 cannot be detached. That is, the dome cover assembly 19 is temporarily fixed in the hanging state with a small gap between the dome cover assembly 19 and the apparatus main body 35 via the dome support 145 at the center. The release of the temporary fixation can be performed, for example, by strongly drawing the dome cover assembly 19.

The dome cover assembly 19 is brought into contact with the apparatus main body 35 by being slightly lifted upward at the time of the permanent fixation. In this state, the dome cover assembly 19 can be permanently fixed by screwing the annular frame housing 21 to the apparatus main body 35 and the base portion 33.

In the camera apparatus 11, the dome cover 17 is subjected to the hydrophilic coating. The dome cover 17 whose surface is hydrophilically coated has high visibility and antifouling properties during rainfall. Since the dome cover assembly 19 can be supported by the apparatus main body 35 by the temporary fixation, it is possible to easily perform screwing work while pressing only the frame housing 21 at the time of the permanent fixation. Accordingly, the camera apparatus 11 can be assembled with good workability without staining the dome cover 17 with fingers, and deterioration in image visibility can be prevented.

In the camera apparatus 11, the engagement mechanism 121 includes the male screw member 49 that hangs down from the base portion 33 with the head portion 123 facing downward, the hole portion 127 into which the male screw member 49 enters is formed in the apparatus main body 35 in the state in which the apparatus main body 35 is parallel to the base portion 33, and the hole portion 127 is provided with the resin spring member 125 that elastically contacts the entered head portion 123 to restrict the detachment of the male screw member 49 from the hole portion 127.

In the camera apparatus 11, the engagement mechanism 121 includes the male screw member 49 provided on the base portion 33 and the resin spring member 125 provided in the hole portion 127 of the apparatus main body 35. The male screw member 49 hangs down from the base portion 33 fixed to the ceiling surface 13, and includes the head portion 123 at a hanging end thereof.

In the apparatus main body 35, the hole portion 127 is provided at a position corresponding to the male screw member 49. The apparatus main body 35 rotates in the direction approaching the base portion 33 with the hook portions 43 that lock the base hinge 53 as fulcrums, and when the apparatus main body 35 is parallel to the base portion 33, the head portion 123 of the male screw member 49 is inserted into the hole portion 127.

The resin spring member 125 is provided in the hole portion 127, and the resin spring member 125 is elastically deformed by being pressed by the head portion 123 of the inserted male screw member 49, and is once moved from the hole portion 127 to a retracted position. When the head portion 123 passes through the resin spring member 125, the resin spring member 125 in which the pressing by the head portion 123 is released again protrudes into the inner hole 23 by the elastic restoring force, and is engaged with a neck portion above the head portion 123 of the male screw member 49. That is, when the apparatus main body 35 attempts to rotate in a direction away from the base portion 33, the resin spring member 125 moves from the neck portion of the male screw member 49 toward the head portion 123 and comes into contact with the head portion 123, so that the resin spring member 125 restricts the detachment of the head portion 123 from the hole portion 127.

Accordingly, the apparatus main body 35 is temporarily fixed so as not to be separated from the base portion 33. The dome cover assembly 19 is further temporarily fixed to the temporarily fixed apparatus main body 35. In the camera apparatus 11, the dome cover assembly 19 is screwed to the base portion 33 in a state of sandwiching the apparatus main body 35, and the apparatus main body 35 and the dome cover assembly 19 are integrated and permanently fixed to the base portion 33.

In the camera apparatus 11, in the base hinge 53, the L-shaped bent portion 55 that is locked to the hook portion 43 is formed on the tip end side in the advancing direction of the base hinge 53, and the hook insertion hole 57 through which the hook portion 43 is able to pass is formed on the base end side of the L-shaped bent portion 55.

In this camera apparatus 11, the hook portion 43 formed on the base portion 33 is disposed to hang down in a J-shape from the outer periphery of the circular base portion 33 fixed to the ceiling surface 13. The hooking portion of the J-shaped lower end is directed radially outward of the base portion 33.

On the other hand, the base hinge 53 advances in parallel to an outer side in the radial direction from the disk-shaped main body base 51 provided in the apparatus main body 35. When the apparatus main body 35 is hooked to the base portion 33, the apparatus main body 35 is brought close to the hook portion 43 in a direction substantially perpendicular to the ceiling surface 13 with a back surface side facing a base portion side.

In the base hinge 53, the L-shaped bent portion 55 bent in the direction opposite to the hook portion 43 is formed at the tip end side in the advancing direction. The hook insertion hole 57 through which the hook portion 43 can pass is formed in the base hinge 53 on the base end side of the L-shaped bent portion 55.

Therefore, in the base hinge 53, by bringing the hook insertion holes 57 close to the hook portions 43 of the base portion 33 and then inserting the hook portions 43 into the hook insertion holes 57, the L-shaped bent portions 55 are hooked to the hook portions 43. Accordingly, the base hinge 53 can rotate in the direction approaching the base portion 33 with the hook portions 43 as fulcrums while maintaining the locked state by the L-shaped bent portions 55 moving (sliding) along the J-shaped inner peripheral surfaces of the hook portions 43.

In the camera apparatus 11, the pair of parallel long holes 59 elongated in the advancing and retracting direction are formed in the base hinge 53, and the base hinge 53 is slidably supported in the longitudinal direction of the long holes 59 by the fixing screws 61 that are inserted into the respective the long holes 59 and that are fixed to the apparatus main body 35.

In the camera apparatus 11, the base hinge 53 includes the pair of parallel long holes 59 elongated in the advancing and retracting direction. The base hinge 53 is slidably supported in the longitudinal direction of the long holes 59 by the fixing screws 61 that are inserted into the respective long holes 59 and that are fixed to the apparatus main body 35.

Since the base hinge 53 is guided and supported by the fixing screws 61 inserted through the pair of long holes 59, the base hinge 53 can move in a substantially straight line in the advancing and retracting direction, and the apparatus main body 35 suspended from the base portion 33 is less likely to swing in any direction. Accordingly, it is possible to improve the connection workability of the cable 111 with respect to the apparatus main body 35.

In the camera apparatus 11, the base hinge 53 is biased in the retracting direction by the tension spring 73 provided over the apparatus main body 35.

In the camera apparatus 11, the base hinge 53 is biased in the retracting direction by the tension spring 73 provided over the apparatus main body 35 and the base hinge 53. Except when the base hinge 53 is in the suspended state, the base hinge 53 is biased by the tension spring 73 and is accumulated inside from the outer periphery of the main body base 51. When the base hinge 53 is hooked to the hook portions 43, a load of the apparatus main body 35 is applied to the tension spring 73. The tension spring 73 extends in the axial direction by being pulled by the load of the apparatus main body 35 to allow the base hinge 53 to be drawn out. The tension spring 73 accumulates the elastic restoring force while the load of the apparatus main body 35 acts.

In the tension spring 73, when the apparatus main body 35 is rotated in the direction approaching the base portion 33 with the hook portions 43 as fulcrums, the load applied from the apparatus main body 35 gradually decreases as the load supported by the hook portions 43 increases. Therefore, the tension spring 73 causes the base hinge 53 to retract to the main body base 51 by the accumulated elastic restoring force. Accordingly, the base hinge 53 is substantially completely accommodated in the main body base 51 in the state in which the apparatus main body 35 is parallel to the base portion 33.

Accordingly, in the camera apparatus 11, when the apparatus main body 35 in the suspended state is temporarily fixed to the base portion 33, the base hinge 53 can be automatically accommodated, and smooth work of shifting the apparatus main body 35 to the temporarily fixed state substantially only by a rotation operation is allowed.

The method of attaching a camera apparatus includes: the base portion attachment step of fixing the disk-shaped base portion 33 including the hook portion 43 to the ceiling surface 13; the main body suspension step of suspending the apparatus main body 35 to the base portion 33 by drawing out the base hinge 53 locked to the hook portions 43 from the apparatus main body 35 on which the camera 15 and the connector 109 are mounted and locking the base hinge 53 to the hook portions 43; the cable connection step of connecting the cable 111 to the connector 109; and the main body temporary fixing step of temporarily fixing the apparatus main body 35 and the base portion 33 such that the apparatus main body 35 and the base portion 33 are not able to be separated from each other via the engagement mechanism 121 that is provided over the apparatus main body 35 and the base portion 33 in the state in which the base hinge 53 is retracted to the apparatus main body 35 while the apparatus main body 35 is rotated in the direction approaching the base portion 33 with the hook portions 43 as fulcrums, and the apparatus main body 35 is parallel to the base portion 33.

In the method of attaching a camera apparatus according to the first embodiment, in the base portion attachment step, the disk-shaped base portion 33 including the hook portions 43 is fixed to the ceiling surface 13.

In the hook portions 43 of the base portion 33 fixed to the ceiling surface 13, in the main body suspension step, the apparatus main body 35 on which the camera 15 and the connector 109 are mounted is suspended. The apparatus main body 35 is suspended from the base portion 33 by the base hinge 53 being drawn out and the tip end of the base hinge 53 being locked to the hook portions 43.

In the suspended apparatus main body 35, in the cable connection step, the cable 111 is drawn. At this time, in the suspended apparatus main body 35, the front surface on which the camera 15, the connector 109, and the like are mounted and the back surface including the drawing-in holes 115 of the cable 111 and the like are exposed at the same time. Therefore, the operator can easily pass the cable 111 from the back surface to the front surface of the apparatus main body 35 using both hands without holding the apparatus main body 35 by a hand, and can easily and safely perform the connection work of the cable 111.

The apparatus main body 35 in which the drawing and connection of the cable 111 are completed is rotated in the direction in which the apparatus main body 35 approaches the base portion 33 with the hook portions 43 as fulcrums in the main body temporary fixing step. The rotated apparatus main body 35 is finally parallel to the base portion 33 while the base hinge 53 is retracted to the apparatus main body 35. The apparatus main body 35 disposed parallel to the base portion 33 is temporarily fixed so as not to be separated from the base portion 33 by the engagement mechanisms 121 provided over the apparatus main body 35 and the base portion 33.

In the method of attaching a camera apparatus, the apparatus main body 35 is suspended from the base portion 33 fixed to the ceiling surface 13, and the front surface and the back surface of the apparatus main body 35 can be held in a state of being exposed at the same time. Accordingly, it is possible to easily perform the drawing-in work with respect to the drawing-in holes 115 that open in the back surface of the apparatus main body 35, and work of coupling the drawn-out cable 111 to the connector 109 provided on the front surface of the apparatus main body 35 with both hands.

Further, in the method of attaching a camera apparatus, in the main body temporary fixing step, the apparatus main body 35 is disposed and temporarily fixed to a substantially operational position, so that it is possible to easily adjust the angle of view (pan, twist, tilt, and yaw rotations) of the camera 15 using both hands.

Therefore, according to the camera apparatus 11 and the method of attaching a camera apparatus according to the first embodiment, it is possible to improve workability by enabling the connection or the like of the cable 111 without supporting the apparatus main body 35 by a hand during installation.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present invention. Components in the above-described embodiments may be combined freely within a range not departing from the spirit of the invention.

INDUSTRIAL APPLICABILITY

The present disclosure is useful as a camera apparatus and a method of attaching a camera apparatus that enable connection of a cable and the like without supporting an apparatus main body with a hand of an operator during installation and that improve workability.

What is claimed is:
1. A camera apparatus, comprising:
   a substantially disk-shaped base portion that includes a hook portion and that is fixed to a fixed surface;
   an apparatus main body on which a camera portion and a connector are mounted, the apparatus main body including a base hinge configured to be locked to the hook portion and freely move back and forth, and being configured to be suspended from the base portion by locking the base hinge to the hook portion;
   an engagement mechanism that is provided over the apparatus main body and the base portion, and that engages the apparatus main body and the base portion such that the apparatus main body and the base portion are not able to be separated from each other in a state in which the apparatus main body is rotated in a direction approaching the base portion with the hook portion that locks the base hinge as a fulcrum and the apparatus main body is substantially parallel to the base portion; and
   a dome cover assembly that is attached to the apparatus main body to watertightly cover the camera portion and the connector.

2. The camera apparatus according to claim 1,
wherein the apparatus main body includes a substantially disk-shaped main body base,
wherein a substantially disk-shaped pan base that is formed to have a smaller diameter than the main body base and on which the camera portion is mounted is concentrically attached to the main body base, and
wherein the connector is disposed on the main body base radially outward of the pan base.

3. The camera apparatus according to claim 2,
wherein a support column is provided at a center of the apparatus main body, penetrates and protrudes through the pan base, and includes a main body side temporary locking claw at a protruding tip end,
wherein the dome cover assembly includes a frame housing that is formed in a substantially annular shape, that is attached to the apparatus main body, and that watertightly fixes an outer periphery of a transparent dome cover to an inner hole, and
wherein a dome support is provided at a center of the dome cover, protrudes toward an inner peripheral side, and includes a cover side temporary locking claw that is able to be temporarily locked to the main body side temporary locking claw of the support column.

4. The camera apparatus according to claim 1,
wherein the engagement mechanism includes a male screw member that hangs down from the base portion with a head portion facing downward,
wherein a hole portion into which the male screw member enters is formed in the apparatus main body in a state in which the apparatus main body is parallel to the base portion, and
wherein the hole portion is provided with a resin spring member that elastically contacts the entered head portion to restrict detachment of the male screw member from the hole portion.

5. The camera apparatus according to claim 1,
wherein in the base hinge, an L-shaped bent portion that is locked to the hook portion is formed on a tip end side of the base hinge in an advancing direction, and a hook insertion hole through which the hook portion is able to pass is formed on a base end side of the L-shaped bent portion.

6. The camera apparatus according to claim 1,
wherein a pair of parallel long holes elongated in an advancing and retracting direction are formed in the base hinge, and
wherein the base hinge is slidably supported in a longitudinal direction of the long holes by a fixing screw that is inserted into each of the long holes and that is fixed to the apparatus main body.

7. The camera apparatus according to claim 1,
wherein the base hinge is biased in a retracting direction by a tension spring provided over the apparatus main body.

8. A method of attaching a camera apparatus, comprising:
a base portion attachment step of fixing a substantially disk-shaped base portion that includes a hook portion to a fixed surface;
a main body suspension step of drawing out a base hinge that is locked to the hook portion from an apparatus main body on which a camera portion and a connector are mounted, locking the base hinge to the hook portion, and suspending the apparatus main body from the base portion;
a cable connection step of connecting a cable to the connector; and
a main body temporary fixing step of temporarily fixing the apparatus main body and the base portion such that the apparatus main body and the base portion are not able to be separated from each other via an engagement mechanism that is provided over the apparatus main body and the base portion in a state in which the base hinge is retracted to the apparatus main body while the apparatus main body is rotated in a direction approaching the base portion with the hook portion as a fulcrum, and the apparatus main body is substantially parallel to the base portion.

\* \* \* \* \*